(12) United States Patent
Kocaman et al.

(10) Patent No.: US 11,940,986 B1
(45) Date of Patent: Mar. 26, 2024

(54) DETERMINING REPAIR STATUS INFORMATION USING UNSTRUCTURED TEXTUAL REPAIR DATA IN RESPONSE TO NATURAL LANGUAGE QUERIES

(71) Applicant: John Snow Labs, Inc., Lewes, DE (US)

(72) Inventors: Veysel Kocaman, Echt (NL); Julio Bonis Sanz, Algete (ES); David Talby, Mercer Island, WA (US)

(73) Assignee: John Snow Labs, Inc., Lewes, DE (US)

( * ) Notice: Subject to any disclaimer, the term of this patent is extended or adjusted under 35 U.S.C. 154(b) by 80 days.

(21) Appl. No.: 17/894,004

(22) Filed: Aug. 23, 2022

(51) Int. Cl.
*G06F 16/00* (2019.01)
*G06F 16/215* (2019.01)
*G06F 16/23* (2019.01)
*G06F 16/25* (2019.01)
*G06F 16/28* (2019.01)

(52) U.S. Cl.
CPC ........ *G06F 16/2365* (2019.01); *G06F 16/215* (2019.01); *G06F 16/258* (2019.01); *G06F 16/285* (2019.01)

(58) Field of Classification Search
None
See application file for complete search history.

(56) References Cited

U.S. PATENT DOCUMENTS 10,733,566 B1  8/2020  Chan et al.
2009/0313508 A1*  12/2009  Yan ............... G06F 11/0706
                                                        714/E11.179

(Continued)

FOREIGN PATENT DOCUMENTS

WO  2015031449 A1  3/2015

OTHER PUBLICATIONS

Colin Raffel et al., "Exploring the Limits of Transfer Learning with a Unified Text-to-Text Transformer", dated Jul. 28, 2020 and retrieved on Aug. 19, 2021 from https://arxiv.org/abs/1910.10683, 67 pages.

(Continued)

*Primary Examiner* — Thu Nguyet T Le
(74) *Attorney, Agent, or Firm* — VLP Law Group LLP; James A. D. White

(57) ABSTRACT

Techniques are described for performing automated operations related to identifying and using repair and maintenance status information, such as summarizing and encoding such information for one or more repair areas or other target domains, identifying specific repair or maintenance status information in response to natural language queries, and using the identified repair status information in further automated manners in some situations (e.g., to automatically initiate repair or maintenance actions on a particular target computing device). Identifying of specific repair status information in response to a particular natural language query may include initially identifying one or more candidate data groupings that match an encoded version of the natural language query (e.g., extracting encoded data groupings that match a generated version of the query), and optionally further analyzing one or more matching candidate data groupings as part of determining the actual response.

30 Claims, 14 Drawing Sheets

(56) References Cited

U.S. PATENT DOCUMENTS

| | | | |
|---|---|---|---|
| 2010/0286841 A1* | 11/2010 | Subbloie | G06F 1/3203 |
| | | | 700/295 |
| 2018/0060487 A1 | 3/2018 | Barkan et al. | |
| 2018/0322958 A1 | 11/2018 | Kalafatis | |
| 2020/0134024 A1 | 4/2020 | Banisakher et al. | |
| 2020/0226164 A1 | 7/2020 | Eifert et al. | |
| 2021/0118536 A1 | 4/2021 | Katouzian et al. | |
| 2021/0319858 A1 | 10/2021 | Reumann et al. | |

OTHER PUBLICATIONS

Julio Bonis, "A cognitive search engine and question answering system using SparkNLP", dated Jul. 19, 2021 and retrieved on Aug. 19, 2021 from https://medium.com/@drbonis/a-cognitive-search-engine-and-question-answering-system-using-sparknlp-and-t5-b3902e517586, 18 pages.

Santhosh Hari, "Locality Sensitive Hashing for Similar Item Search", dated Jul. 5, 2018 and retrieved on Aug. 19, 2021 from https://towardsdatascience.com/locality-sensitive-hashing-for-music-search-f2f1940ace23, 12 pages.

SQuAD2.0—The Stanford Question Answering Dataset, retrieved on Jan. 24, 2022 from htttps://rajpurkar.github.io/SQuAD-explorer/, 39 pages.

Qiao Jin et al., "PubMedQA: A Dataset for Biomedical Research Question Answering", dated Sep. 13, 2019 and retrieved on Jan. 24, 2022 from https://arxiv.org/abs/1909.06146, 11 pages.

Emre Varol, "Creating Clinical Knowledge Graph by Spark NLP & Neo4j", dated Sep. 21, 2021, retrieved on Mar. 11, 2022 from medium.com/spark-nlp/creating-knowledge-graph-by-spark-nlp-neo4j-9d18706aa08b, 16 pages.

Veysel Kocaman et al., "Improving Clinical Document Understanding on COVID-19 Research with Spark NLP", dated Dec. 7, 2020, retrieved on Jan. 24, 2022 from https://arxiv.org/abs/2012.04005, 9 pages.

GPT-3, Wikipedia, retrieved on Oct. 16, 2021 from en.wikipedia.org/wiki/GPT-3, 9 pages.

OHDSI OMOP Common Data Model, retrieved on Oct. 14, 2021 from www.ohdsi.org/data-standardization/the-common-data-model/, 2 pages.

Spark NLP, retrieved on Mar. 11, 2022 from nlp.johnsnowlabs.com/, 14 pages.

Federico Fancellu et al., "Neural Networks for Negation Scope Detection", Proceedings of the 54th Annual Meeting of the Association for Computational Linguistics, Aug. 7-12, 2016, 10 pages.

* cited by examiner

Example Computer Maintenance Log

...
did virus/malware scan - 02/01/XX 5:15pm — 220a
did virus/malware scan - 02/02/XX 5:13pm — 220b
did virus/malware scan - 02/03/XX 5:14pm — 220c
did virus/malware scan - 02/04/XX 5:15pm
did Windows update - 02/04/XX 5:18pm
check for other software update

| Program | Update | Status | Time |
|---|---|---|---|
| Adobe Acrobat | none | - | - |
| MS Word | optional update XYZ | install succeeded | 02/04/XX 5:19pm |
| MS Excel | optional update WXY | install failed | 02/04/XX 5:20pm |
| ... | | | |

— 220d delete cookies - 02/04/XX 5:42
do backup (C:\Users\bob) - 02/04/XX 5:45
did virus/malware scan - 02/05/XX 5:15pm
did virus/malware scan - 02/07/XX 5:15pm
did virus/malware scan - 02/08/XX 5:15pm
did virus/malware scan - 02/09/XX 5:15pm
did virus/malware scan - 02/10/XX 5:15pm
did virus/malware scan - 02/11/XX 5:15pm
...

200b

Example Computer Repair Invoice

COMPUTER REPAIR INVOICE

DETAILS
DATE: 02/01/XX
INVOICE NO. 0012435
TECHNICIAN: TTT

FROM
COMPANY: Company EEE
ATTN: FFF
ADDRESS: 2345 XXX
CITY, STATE: XXX, XX
ZIP: XXXXX
PHONE: XXX-XXX-XXXX
E-MAIL: XXX

BILL TO
COMPANY: Company CCC
ATTN: DDD
ADDRESS: 1234 XXX
CITY, STATE: XXX, XX
ZIP: XXXXX
PHONE: XXX-XXX-XXXX
E-MAIL: XXX

| SERVICE | HOURS | RATE ($/HR) | AMOUNT ($) |
|---|---|---|---|
| Screen Replacement | 2.2 | 75 | 165.00 |
| OS Backup/Restore | 3.1 | 25 | 77.50 |
| | | TOTAL | 242.50 |

| PARTS / MATERIALS | QUANTITY | UNIT PRICE | AMOUNT ($) |
|---|---|---|---|
| Part Name PPP | 1 | 34.00 | 34.00 |
| Part Name QQQ | 2 | 17.55 | 35.10 |
| | | TOTAL | 69.10 |

NOTES: 1) Screen giving error 6XXX-rejected
2) Upgrade OS to Windows 11vX
3) Customer noted prior work about 2 weeks ago to do malware update/scan

| | |
|---|---|
| SUBTOTAL | 311.60 |
| SHIPPING | – |
| TAX / VAT | 31.20 |
| TOTAL | 342.80 |

Example Queries

235a { - what is the average time involved in defragmentation treatment of hard drives having sizes between 500GB and 1TB?

235b { - identify devices with virus infections between April and June
- identify devices with Windows 10, over 1 year old on January $1_{st}$ 2022, with a diagnosis of disk fragmentation
- identify devices with XXX, excluding devices having cellular connections 235c { - does device XXX have at least 10GB of free storage space and not have program YYY installed?

*Fig. 2E*

Example Data Extraction and Linking

285a — RE: <patient name>
Employer: <employer name>

285b — Weight: 200 lbs
Height: 6' 2"

285c — Lumbar Flexion: 60°
Extension: 10°

285d — CT Scan: solid fusion at C6-7
MRI Scan: protrusion at C6-7

285e — Medications: XXX

285f — Past Procedures: XXX

290a

290b

290c

290d — a patient cannot have menopause and pregnancy statuses at same time

Example Queries

295a — - what are the most frequent enalapril dosages used for the treatment of hypertension in comparison with the treatment of chronic heart failure"?

295b — - identify patients with heart attacks between 2019 and 2021
- identify patients with male status, over 65 years old on January 1$^{st}$ 2019, with a diagnosis of hypertension
- identify patients with XXX, excluding patients in treatment with losartan 295c — - is patient XXX allergic to aspirin?

*Fig. 2G*

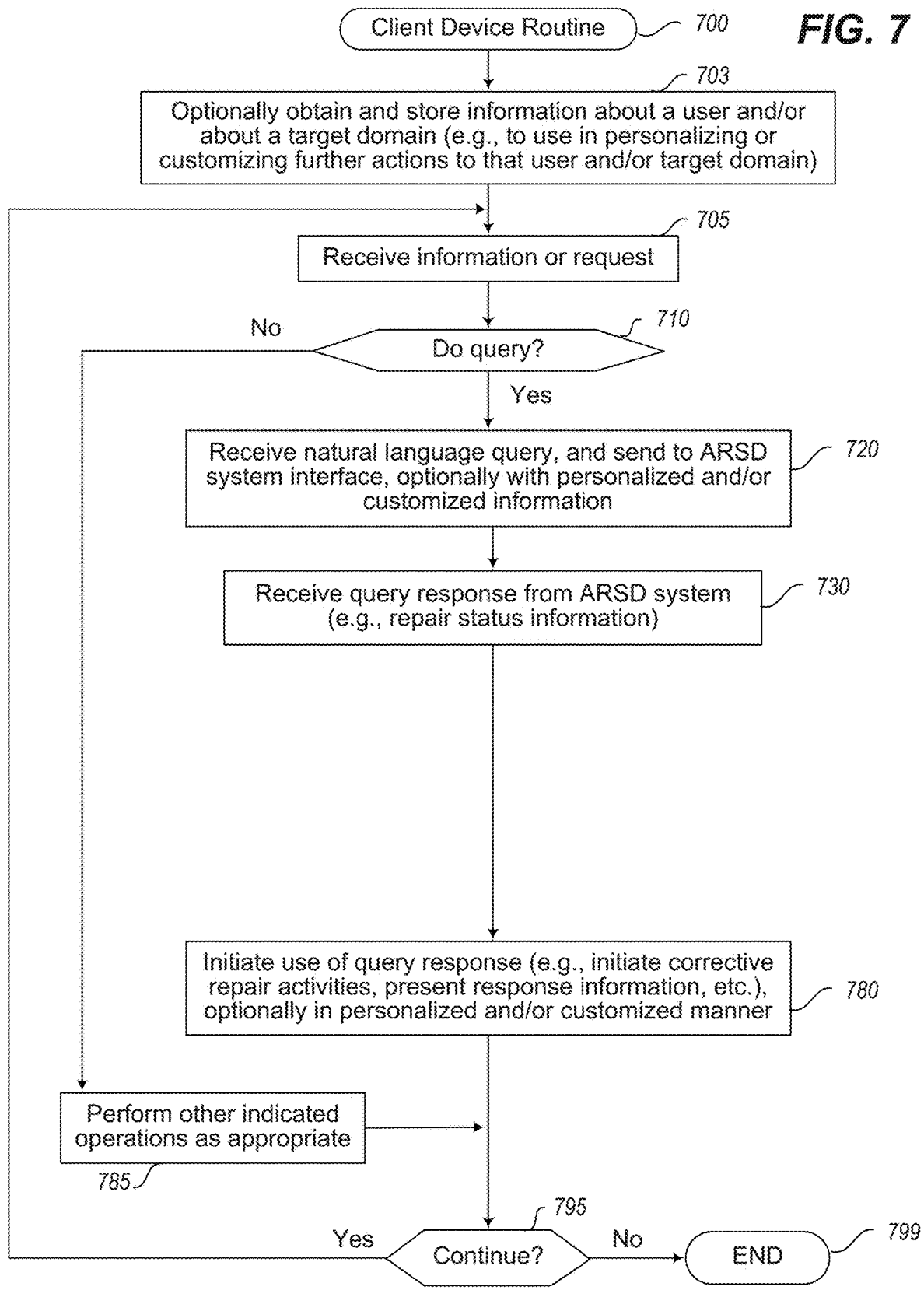

US 11,940,986 B1

DETERMINING REPAIR STATUS INFORMATION USING UNSTRUCTURED TEXTUAL REPAIR DATA IN RESPONSE TO NATURAL LANGUAGE QUERIES

TECHNICAL FIELD

The following disclosure relates generally to automated techniques for determining repair status information in response to natural language queries and based at least in part on analysis of unstructured textual repair data, such as for use in automatically determining repairs of specific types that have been made to groups of otherwise unrelated computing devices or for other types of repair status information.

BACKGROUND

An abundance of information is available to users on a wide variety of topics from a variety of sources. For example, portions of the World Wide Web ("the Web") are akin to an electronic library of documents and other data resources distributed over the Internet, with billions of documents available, including groups of documents directed to various specific topic areas. In addition, various other information is available via other communication mediums.

However, existing search engines and other techniques for identifying information of interest suffer from various problems. Non-exclusive examples include a difficulty in identifying and using specific search terms in a useful manner, difficulty in finding answers specific to a particular topic of interest, receiving an overabundance of responses to a query that are too extensive to easily review and with many or most (or sometimes all) being only partially relevant or not relevant to the query (and that thus obscure relevant information if it actually is included in the responses), etc.

BRIEF DESCRIPTION OF THE DRAWINGS

FIGS. 2A-2G illustrate examples of performing described techniques, including automatically determining repair or maintenance status information in response to natural language queries for computing devices or other types of repair or maintenance status information.

FIG. 7 illustrates a flow diagram of an example embodiment of a client device routine.

DETAILED DESCRIPTION

Figure 1A:
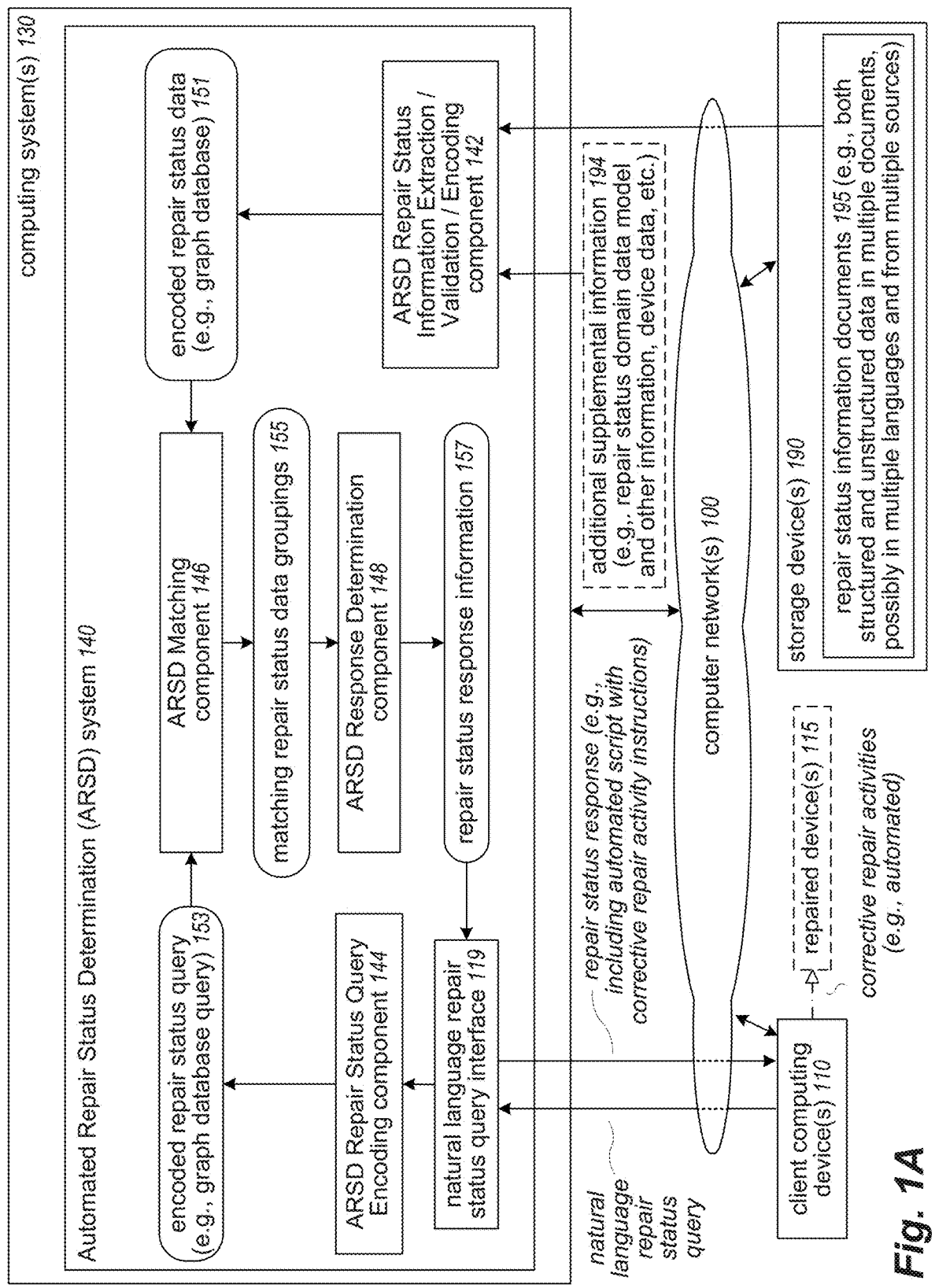
FIGS. 1A and 1B are network diagrams illustrating an example environment and a system for performing described techniques, including automatically determining repair or maintenance status information in response to natural language queries for computing devices or other types of repair or maintenance status information.

The present disclosure describes techniques for using computing devices to perform automated operations related to identifying and using repair and/or maintenance status information—such techniques may include, for example, summarizing and encoding information about repair and maintenance activities performed on a number of devices (e.g., of multiple types), determining specific repair and/or maintenance status information of one or more specified types in response to natural language queries (e.g., for one or more particular such devices that are identified based on those queries, such as a group of multiple devices that are otherwise unrelated and optionally of multiple types), and subsequently using the identified repair and/or maintenance status information in one or more further automated manners in some situations. In at least some embodiments, the identified status information about repair and/or maintenance activities relates to computing devices (e.g., computer systems, such as desktop computers, laptop computers, tablet computers, server computing systems, etc.; smart phones; etc.), with the identified repair and/or maintenance activity status information (referred to subsequently herein at times as "repair" activities or "repair" status information but intended to include both repair and maintenance activities or both repair and maintenance activity status information, respectively, unless otherwise indicated explicitly or by context) being analyzed in some such embodiments and situations to identify areas for corrective activities (e.g., additional repair activities to be performed, problems in previous repair activities to be corrected, etc.) for one or more target computing devices, and the use of such information may include automatically initiating some or all such corrective activities on the target computing device(s). In addition, in at least some embodiments, various techniques may be used to improve speed and/or accuracy of determined responses to received natural language queries, including analyzing and validating and encoding information about repair activities for a plurality of devices (e.g., identifying particular repair and/or maintenance events and/or associated objects used, determining associated timelines, performing consistency checking, etc.), such as in a graph database according to a defined domain-specific data model, and then analyzing and encoding received natural language queries using the graph database format for use in identifying matching information in the encoded repair status information. Additional details are included below regarding the automated summarization, identification and use of repair status information, and some or all of the techniques described herein may in at least some embodiments be performed via automated operations of an Automated Repair Status Determination ("ARSD") system, as discussed further below.

In at least some embodiments, the described techniques include summarizing and encoding repair status information for a number of types of repair activities. For example, a group of information specific to one or more types of repair activities (e.g., involving some or all repair activities for a specific type or class of computing device or for a specific computing device) may be identified (e.g., in a plurality of documents from a plurality of sources and including both structured data and unstructured data, and with information for a particular device or other entity potentially identified in multiple documents from multiple sources and optionally in multiple languages), and may be analyzed to separate that group of information into smaller groupings of related data (e.g., per device or other entity, per repair activity event and/or repair service provider encounter, per repair activity type, etc.). Each such data grouping may then be further analyzed, including to identify and validate particular data of interest (e.g., identifying particular events and/or objects, determining associated timelines, performing consistency checking, etc.), and to optionally identify additional expanded content associated with that data grouping (e.g., additional information about particular devices or other entities), with the resulting data then encoded (e.g., in one or more graph databases to provide a consistent format of information extracted from both structured and unstructured data) and stored for subsequent use. In at least some embodiments, the analysis activities for a data grouping may include using a language model (e.g., to perform semantic similarity matching, such as by learning and using synonyms and/or associated information at different levels of generality and/or specificity). In addition, in at least some such embodiments, the described techniques include automated operations of the ARSD system to anonymize or otherwise redact some of the repair status information and/or other associated information about particular devices or other entities. Additional details are included below regarding summarizing and encoding repair status information, such as identifying and validating of particular data of interest, including with respect to the examples of FIGS. 2A-2G and elsewhere herein.

In addition, in at least some embodiments, the described techniques further include using encoded repair status information (e.g., for a number of types of repair activities and for multiple associated devices or other entities) to respond to queries received in a natural language format. For example, the described techniques may include receiving a query in freeform natural language text, performing natural language processing on the freeform text to identify keywords or other features to use in performing a corresponding search, converting the keywords or other features into one or more queries (e.g., using a graph database format), and performing one or more corresponding searches (e.g., graph database searches) to identify matching data groupings. In at least some embodiments, the performing of the search(es) to identify matching data groupings may include identifying one or more initial candidate data groupings that satisfy the search(es), and optionally obtaining additional expanded content to supplement the candidate data groupings that are used as part of one or more final data groupings used in the response to the query. As non-exclusive examples, the initial candidate data groupings may include data from one or more stored graph databases about one or more particular repair activities or other repair status for one or more particular devices or other entities, and the additional expanded content may be of one or more additional types and optionally from one or more other sources separate from the graph database(s) (e.g., additional information about configuration and/or composition and/or history of a particular device or other entity, optionally to include prior usage activities or other prior non-repair activities for the device or other entity, and whether from the same graph database(s) or one or more other sources; additional information determined about problems or other issues in the repair activities or other status for the device or other entity, whether from the one or more graph database(s) or one or more other sources, such as to be dynamically determined, and optionally to include one or more corrective activities to be implemented in an automated or other manner; additional information inferred about current and/or future status of a particular device or other entity based on prior repair activities and/or other additional information about the device or other entity, such as based on effects of prior repair activities and/or other prior non-repair activities; etc.). Additional details are included below regarding such use of encoded repair status information, such as related to determining and providing responses to received queries, including with respect to the examples of FIGS. 2A-2G and elsewhere herein.

The described techniques may further be used in various manners to address various types of problems. As noted above, in some embodiments the described techniques include identifying repair status information related to a particular computing device or particular type of computing device, and in some such cases providing response information that includes information about one or more corrective activities to be performed, optionally in an executable format to initiate one or more automated corrective actions on that particular computing device or on one or more computing devices of that particular type. In other embodiments, the identified repair status information may be used in other manners, such as to be provided to one or more users (e.g., the user who supplied the corresponding natural language query) for further use (e.g., to display or otherwise present some or all of the identified repair status information to the one or more users), such as for situations in which at least some further user activity is involved (e.g., remove a battery from a smart phone, attach a cable to a specified port, etc.). In some embodiments, the identified repair status information may be for types of repair activities or other repair status information that does not involve computing devices, such as repair status information related to one or more types of medical repair activities (e.g., treatments, procedures, drugs taken, medical devices used, etc.) that have been performed on an indicated human or other patient entity (e.g., to repair the patient with respect to an indicated medical symptom and/or medical condition of the patient, such as by a type of treatment specified in corresponding indicated medical repair status information; to perform maintenance on the patient, such as with respect to an indicated medical symptom and/or medical condition by performing preventive activities to reduce the likelihood of an indicated medical symptom and/or medical condition arising, etc.) or other medical status for such a patient (e.g., diseases or other conditions of a patient, prior patient activities that affect patient health, etc.)—in such embodiments, the repair status information that is summarized and encoded may include both structured and unstructured data such as, for example, doctors' notes about patients, records of hospitals or other facilities or entities related to treatments (e.g., electronic medical records, or EMRs, from hospitals and/or pharmacies and/or other medical facilities, treatment records from other entities with such information such as insurance companies and/or credit card processing systems, etc.), and additional supplemental information may include information about effects of various activities (e.g., drug interactions, medical guidelines or other information about effects of particular medications and/or activities, etc.). In addition, in at least some embodiments, the described techniques include automated operations of the ARSD system to anonymize or otherwise redact some of the repair status information and/or other associated information about particular devices or other entities (e.g., to anonymize patient data to satisfy HIPPA, or Health Insurance Portability and Accountability Act, requirements; to satisfy GDPR, or General Data Protection Regulation, requirements, etc.).

In addition, while various of the discussion herein refers to data groupings that are extracted from "documents", such as for structured and/or unstructured data, it will be appreciated that the described techniques may be used with a wide variety of types of content items and that references herein to a "document" apply generally to any such type of content item unless indicated otherwise (explicitly or implicitly based on the context), including, for example, textual documents (e.g., Web pages, word processing documents, slide shows and other presentations, emails and other electronic messages, etc.), visual data (e.g., images, video files, etc.), audio data (e.g., audio files), software code, firmware and other logic, genetic codes that each accompany one or more sequences of genetic information, other biological data, etc. Furthermore, the content items may be of one or more file types or other data structures (e.g., streaming data), including document fragments or other pieces or portions of a larger document or other content item, and the contents of such content items may include text and/or a variety of other types of data (e.g., binary encodings of audio information; binary encodings of video information; binary encodings of image information; mathematical equations and mathematical data structures, other types of alphanumeric data structures and/or symbolic data structures; encrypted data, etc.). In some embodiments, each of the documents has contents that are at least partially textual information, while in other embodiments at least some documents or other content items may include other types of content (e.g., images, video information, audio information, etc.).

The described techniques provide various benefits in various embodiments, including to significantly improve the identification and use of responsive information to specified queries, including queries specified in a natural language format, and with such described techniques used in some situations to automatically determine and implement repair activities performed on indicated computing devices or other repair status information for such devices. Such automated techniques allow such response information to be generated much more quickly and efficiently than previously existing techniques (e.g., using less storage and/or memory and/or computing cycles) and with greater accuracy, based at least in part on using one or more of the following: the described use of one or more graph databases, including to identify and model relationships between particular entities, objects, attributes, etc.; the described use of encoding, storage and retrieval of extracted data; the described validation model for extracted data, including consistency checking with respect to timelines and other extracted data; the described use of domain-specific information to improve and customize the summarization and encoding of information for that domain; etc. Non-exclusive examples of additional related benefits of the described techniques include the following: enabling the processing and use of much larger groups of information; enabling providing a 'no answer' response if a response to a specified query is not identified (rather than providing a search list of many results that do not include the responsive answer); enabling identifying responses to queries that are more general (e.g., open-ended); enabling identifying responses to queries using information of multiple levels of generality or specificity; enabling identifying responses to queries using timelines that are identified from extracted data; enabling identifying responses to queries using additional information that is identified from extracted data, such as related to inferred effects or other inferred information; etc. In addition, in some embodiments the described techniques may be used to provide an improved GUI in which a user may more accurately and quickly obtain information, including in response to an explicit request (e.g., in the form of a natural language query), as part of providing personalized information to the user, etc. Various other benefits are also provided by the described techniques, some of which are further described elsewhere herein.

For illustrative purposes, some embodiments are described below in which specific types of information are acquired, used and/or presented in specific ways and by using specific types of automated processing—however, it will be understood that the described techniques may be used in other manners in other embodiments, and that the invention is thus not limited to the exemplary details provided. As one non-exclusive example, while specific types of data structures (e.g., databases, domain-specific data models, language models, etc.) are generated and/or used in specific manners in some embodiments, it will be appreciated that other types of information may be similarly generated and used in other embodiments, including for repair status information for areas other than involving computing devices (e.g., for medical-related repair and status information) and/or for types of activities other than repair and maintenance actions, and that responses to queries may be used in other embodiments in manners other than automated corrective repair actions, including display or other presentation. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical or related reference numbers may be used in the drawings to identify the same or similar elements or acts.

FIG. 1A is a network diagram illustrating an example environment in which a system for automatically determining repair status information for computing devices or other types of repair status information in response to natural language queries may be configured and provided. In particular, an embodiment of an ARSD system 140 is executing on one or more computing systems 130, and includes several components 142, 144, 146 and 148 that generate and use various information 151, 153, 155 and 157.

In particular, as part of the automated operations of the ARSD system 140 in this illustrated example embodiment, the system 140 obtains information from various repair status information documents 195 on one or more storage devices 190 about multiple types of repair activities performed and other repair status information for one or more repair domains, such as over the computer network(s) 100. The contents of the repair status information documents 195 are received by the ARSD Repair Status Information Extraction/Validation/Encoding component 142, which analyzes those contents in order to generate encoded repair status information 151, which in this example embodiment includes groupings of related data that are stored in one or more graph databases (not shown) and optionally additional expanded content for some or all such data groupings (e.g., additional inferred contents about effects of prior repair activities and/or other associated activities). The encoded repair status information 151 is then made available to an ARSD Matching component 146 for further use in addressing queries received from users.

In addition, the ARSD system operates in an online manner in the illustrated embodiment and provides a graphical user interface (GUI) (not shown) and/or other interfaces 119 to enable one or more remote users (not shown) of client computing devices 110 to interact over the one or more intervening computer networks 100 with the ARSD system 140 to obtain functionality of the ARSD system. In particular, a particular client computing device 110 may interact over the one or more computer networks 100 with the natural language repair query interface 119 in order to submit a query about one or more types of repair status information (e.g., all available repair status information), such as for an indicated computing device or indicated type of computing device (e.g., corresponding to an associated device 115 for which additional corrective repair activities may be performed, and/or for the client computing device 110 itself) or other indicated target entity(ies) (e.g., all entities matching one or more specified criteria), and with the query submitted using a natural language format. The ARSD Repair Status Query Encoding component 144 receives the natural language query, and generates a corresponding encoded repair status query 153, which in this example embodiment includes one or more graph database queries that summarize the meaning of the natural language query.

The encoded repair status query 153 is then made available to the ARSD Matching component 146, which compares the encoded repair status query 153 to the encoded repair status information 151 (e.g., executes the one or more queries to perform searches in the one or more graph databases) in order to determine one or more candidate data groupings 155 that match the encoded repair status query 153—for example, the ARSD Matching component 146 may use one or more graph database nodes, relationships, labels and/or properties in and/or associated with the encoded repair status query 153. In some embodiments, the selection of particular candidate data groupings may further match generated embedding vectors for the repair status query and the data groupings, whether instead of or in addition to queries encoded for graph databases and data groupings, such as to use a similarity measure or other distance or difference measure to compare the embedding vector for the repair query to at least some embedding vectors generated for the repair status information 151 and with candidate data groupings selected based on having associated embedding vectors having a similarity measure above a defined threshold (or a distance or other difference measure below a defined threshold), as discussed in greater detail elsewhere herein.

The ARSD Response Determination component 148 then analyzes the matching repair status data groupings 155 in order to determine corresponding repair status response information 157 for the received query, which it then forwards back to the requesting client computing device 110 in response to the received query via the natural language repair query interface 119. The analysis of the matching repair status data groupings 155 may include, for example, analyzing the information of the data groupings to select one or some or all of the data groupings to use as the repair status response information 157, while in other embodiments all such matching data groupings may be used without such selection. As discussed in greater detail elsewhere, the repair status response information 157 may in some embodiments and situations include executable instructions or other information to automatically cause the recipient client computing device 110 and/or an associated computing device that is to be repaired to execute those repair instructions or to otherwise take automated action to perform repair activities (e.g., corrective repair activities, preemptive additional maintenance activities, etc.). If no data grouping 155 is identified as a response to the received query, the component 148 may instead supply a reply message to the requesting client computing device 110 to indicate that no response is available.

After the requesting client computing device 110 receives the repair status response information 157, it may take various actions to use that received information, such as to initiate automated (or other) repair activities on itself or on an associated device 115, and/or may display or otherwise present some or all of the received information to one or more users on the client computing device. The interactions of users and/or client computing devices with the ARSD system 140 to obtain functionality of the ARSD system may involve a variety of interactions over time, including in some cases independent actions of different groups of users and/or client computing devices.

The network 100 may, for example, be a publicly accessible network of linked networks, possibly operated by various distinct parties, such as the Internet, with the ARSD system 140 available to any users or only certain users over the network 100. In other embodiments, the network 100 may be a private network, such as, for example, a corporate or university network that is wholly or partially inaccessible to non-privileged users. Thus, while the ARSD system 140 in the illustrated embodiment is implemented in an online manner to support various users over the one or more computer networks 100, in other embodiments a copy of the ARSD system 140 may instead be implemented in other manners, such as to support a single user or a group of related users (e.g., a company or other organization, such as if the one or more computer networks 100 are instead an internal computer network of the company or other organization, and with such a copy of the ARSD system optionally not being available to other users external to the company or other organizations, such as for a medical facility operating a copy of the ARSD system using medical repair status information available for some or all patients of the medical facility). In addition, the ARSD system 140 and each of its components (including components 142, 144, 146 and 148) may include software instructions that execute on one or more computing systems by one or more processors (not shown), such as to configure those processors and computing systems to operate as specialized machines with respect to performing their programmed functionality.

Additional details related to operations of the ARSD components 142-148 are discussed below with respect to FIG. 1B and elsewhere herein.

Figure 1B:
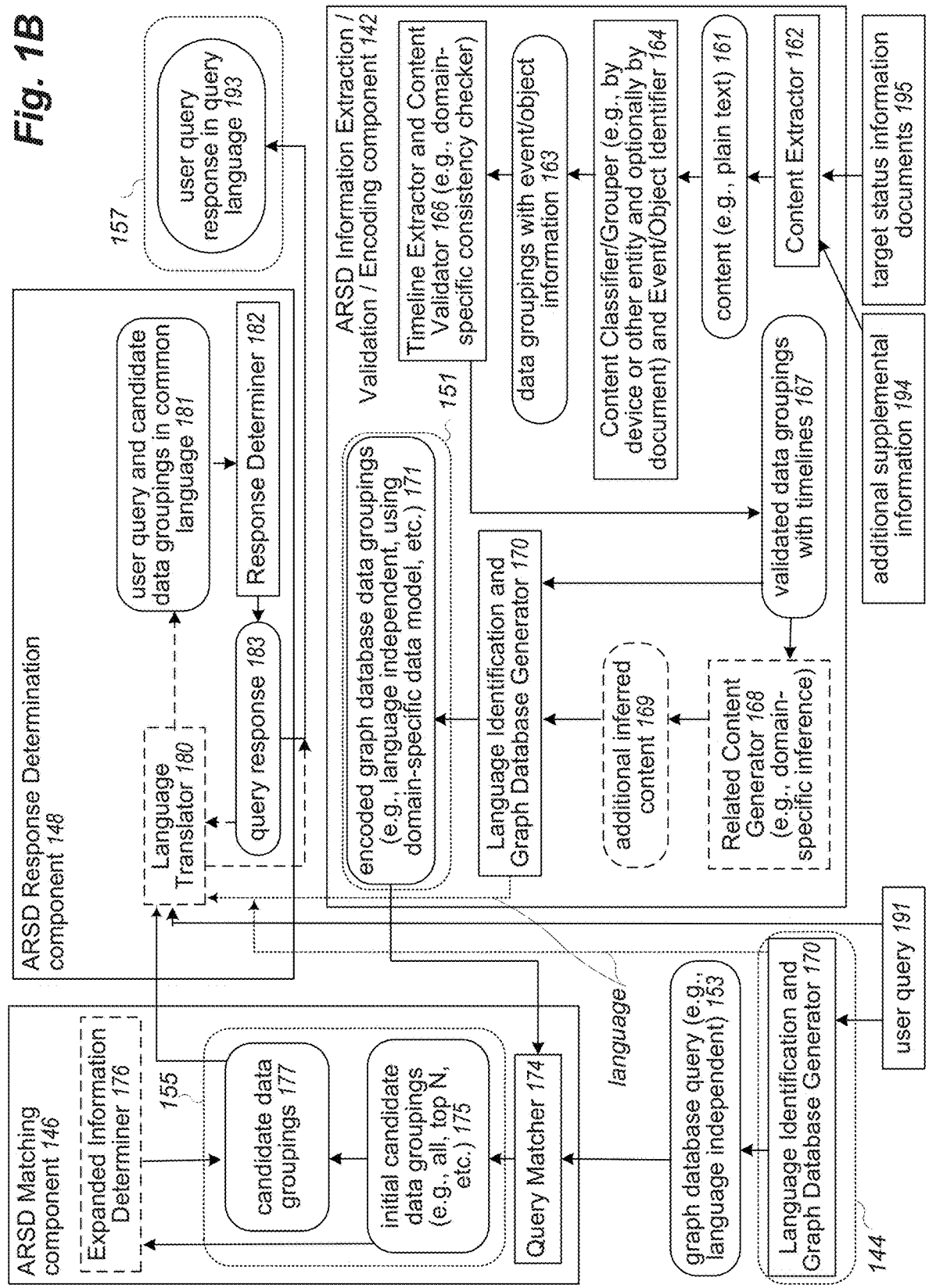

FIG. 1B continues the example of FIG. 1A, and illustrates an example embodiment of the ARSD system that includes additional example details about the ARSD components 142-148 of FIG. 1A, with the ARSD system being capable of providing repair status information (or other types of information) for repair status areas/domains other than computing devices.

In this example embodiment, the ARSD Information Extraction/Validation/Encoding component 142 receives, from target status information documents 195, information about one or more repair status areas/domains, and may further optionally obtain and use additional supplemental information 194 of one or more types as discussed below. Given documents providing status information for multiple devices or other entities and related to a domain (e.g., stored in the form of html, xml, docxs, pptxs, pdfs, images, etc.), the ARSD system may perform automated operations that allow a user to make queries in natural language about the domain and obtain responses based on the content contained in the documents (e.g., in a real-time or near-real-time manner, such as in a matter of seconds or in less than a second). In this example embodiment, the information from the target status information documents 195 is provided to a Content Extractor subcomponent 162 of the component 142, which extracts corresponding content 161 (e.g., in plain text form). In some embodiments, the subcomponent 162 may include optical character recognition (OCR) capabilities to extract text from images or other visual data, as well as different parsers for different supported types of file formats. In addition, in at least some embodiments the subcomponent 162 may receive additional supplemental information 194 and analyze it to include some or all of the information in the content 161, such as in a domain-specific manner—as one non-exclusive example for the medical domain, the additional supplemental information may include information about drug interactions, time-based effects of particular activities (e.g., smoking) and/or medications/treatments, expected results from particular medical procedures or other treatments (e.g., from medical clinical guidelines), etc. In addition, the additional supplemental information 194 may include additional information about specific entities having repair status information in the documents 195, such as demographic information and/or status information for particular people (e.g., medical patients), device recalls, etc.

The content 161 from subcomponent 162 is then provided to a Content Classifier/Grouper and Event/Object Identifier subcomponent 164 of component 142, which separates the content 161 into multiple data groupings 163 of related content (e.g., data groupings of data each associated with a particular device or other entity and/or with a particular repair/maintenance event and/or encounter), such as by using identifying information to link data from different documents about the same entity (e.g., a unique device identifier for a device, such as a MAC address or persistent IP address; a social security number or patient number or patient name or other identifying number for a person; etc.)—as part of the processing, the subcomponent 164 may further perform processing to identify various parts of the content, such as particular entities, particular repair activities, particular conditions to be repaired or ameliorated, particular objects used for repair activities, particular repair-related tests that are performed, etc., optionally based on or associated with particular codes for a particular domain (e.g., with respect to the medical domain, CPT, or Current Procedural Terminology codes; and/or ICD, or International Classification of Diseases, codes; and/or HCPCS, or Healthcare Common Procedures Coding System, codes; etc.), and particular attributes associated with some or all of the other identified parts (e.g., associated timing information, such as start and/or end dates and/or duration times or other types of time periods, and whether using absolute times or times relative to another indicated time, such as a date or other time associated with a document or a particular entry in the document; a level of a repair activity performed, such as a dosage or strength of medicine used or other medical procedure or intervention; results of repair-related tests; etc.).

The data groupings 163 are then supplied to a Timeline Extractor and Content Validator subcomponent 166 of the component 142, which further analyzes information in the data groupings to extract and encode information about dates and other timing aspects of the repair status information, such as to generate timelines associated with particular devices and other entities and associated repair-related activities. The subcomponent 166 may perform further automated operations to validate the generated timelines and optionally other data of the data groupings, such as by performing consistency checks for a particular device or other entity to correlate different repair status information for that device or other entity and/or to use validation rules to ensure that repair information falls within thresholds or otherwise satisfies defined criteria, as part of generating validated data groupings 167 that include the generated timeline information. Additional details are included elsewhere herein related to such analysis and validation operations. In some embodiments, the validated data groupings 167 are further provided to a Related Content Generator subcomponent 168 of the component 142, which further generates additional inferred content 169—such additional content may be generated in a domain-specific manner, such as to infer medical effects on patients based on an amount of time that has passed with respect to repair activities and/or other activities (e.g., an amount of time that a patient has spent smoking, an amount of time that a patient has taken a medication, an amount of time since a patient completed taking a medication and/or received a medical procedure, etc.).

The validated data groupings 167 and additional inferred content 169 (if any) are then supplied to a Language Identification and Graph Database Generator subcomponent 170 of component 142, which optionally identifies a corresponding language (e.g., if multiple languages are in use) for each data grouping (or distinct subset of a data grouping, such as the data in the data grouping that comes from a particular source document) and associates the identified language as an attribute of that data grouping (or subset), with such language information subsequently supplied to an optional Language Translator subcomponent 180 of component 148 for further use in some embodiments. The subcomponent 170 further generates data groupings 171 that are stored in one or more graph databases (not shown), which correspond to information 151 of FIG. 1A, and may further be made available to a Query Matcher subcomponent 174 of the ARSD Matching component 146—the data groupings 171 may, for example, be generated using a domain-specific data model to determine the nodes, relationships, properties and/or labels that are used, such as based on information from the Observational Medical Outcomes Partnership (OMOP) data model for medical status information and other related medical data. While not illustrated in FIG. 1B, the subcomponent 170 may optionally use domain-specific information (e.g., labeled groups of content) as part of the generation of the data groupings 171 if such domain-specific information is available When a user query 191 is received (e.g., expressed in natural language form), it is supplied to the Language Identification and Graph Database Generator subcomponent 170 (whether the same subcomponent 170 of component 142, or a different copy of that subcomponent 170), which generates a representation 153 of the query encoded for the graph database(s) in use (e.g., by using an included model, such as a Generative Pre-Trained Transformer, or GPT, autoregressive language model that uses deep learning and has been trained to generate graph database expressions corresponding to freeform queries, so as to represent the query's semantic meaning)—in a manner similar to that of the data groupings 171, the subcomponent 170 may optionally use domain-specific information (e.g., labeled groups of tokens) as part of the generation of the query 153 if such domain-specific information is available. As with the data groupings 167, the subcomponent 170 also optionally determines the language of the user query 191 if multiple languages are in use, and makes that information available to the Language Translator subcomponent 180 for later use in some embodiments, such as if the ARSD system operates to translate determined responses from one or more other languages to the language in which the user query is received. The Language Identification and Graph Database Generator subcomponent 170 that operates on the user query 191 may, for example, correspond to component 144 of FIG. 1A.

The Query Matcher subcomponent 174 of the ARSD Matching component 146 then operates to compare the query 153 to the data groupings 171 in order to generate initial candidates 175 of data groupings for corresponding data groupings that are identified (e.g., all matching data groupings; a top N number of candidate data groupings, with N being customizable or a fixed number, such as in the range of 20 to 50; etc.). To identify the candidate data groupings, the subcomponent 174 may use graph database structure information (e.g., nodes, relationships, labels, etc.) and/or perform one or more searches of the graph database(s). In some embodiments, the initial data grouping candidates 175 are then supplied to an Expanded Information Determiner subcomponent 176 of the component 146, which generates expanded information for each of one or some or all of the initial data grouping candidates, such as to combine information that is part of additional supplemental information but not otherwise stored as part of the data groupings 171 (e.g., demographic or other information for particular people) and in some cases in storage locations other than the graph database(s). If such expanded information is determined, a combination of the initial data grouping candidates 175 and additional expanded information is then used as the final candidate data groupings 177 (e.g., to correspond to some or all of the information 155 of FIG. 1A.), and otherwise the initial data grouping candidates 175 are used as the final candidate data groupings 177.

The final data groupings information 177 is then optionally provided to a Language Translator subcomponent 180 of the ARSD Response Determination component 148, along with the language information detected for the user query and those data groupings, such as to handle content in the candidate data groupings 177 that are in multiple languages, and/or to handle if the user query 191 and some or all of the data grouping information 177 are in different languages (e.g., to translate all of the information and query to a single language, such as the language of the query, a selected language that may be different from that of some or all of the information, etc.)—alternatively, if the user query 191 and the data grouping information 177 are in the same language, or if multilingual functionality is not used in an embodiment, the information 177 may then directly become content 181 in which the user query and the data groupings are in a common language. The subcomponent 180 may, for example, translate one or more of the pieces of information into a common language (e.g., into the language of the user query), resulting in the information 181 in the common language, such as by using a neuro machine translation model to translate the user query and/or to translate some or all of the candidate data groupings and/or their expanded information (if any). The information 181 is then provided to the Response Determiner subcomponent 182 of the component 148, which generates a query response 183 in the same language as that of the user query 191, which is then output as response 193 for the user query 191—the user query response 193 may, for example, correspond to information 157 of FIG. 1A. In some embodiments, a query response 183 may, for example, include text that is not directly present in a particular data grouping or its expanded content that is used to generate the response, and in some embodiments and situations may include indications of additional non-textual information (e.g., images, audio, etc.) in a document from which the data grouping is extracted (e.g., by including links in the provided response to the corresponding parts of that document, by extracting and bodily including that additional non-textual information, etc.).

While a variety of details have been discussed with respect to the example embodiments of FIGS. 1A-1B, it will be appreciated that other embodiments may not include some such details, and/or may include other functionality that is not illustrated in these examples.

FIGS. 2A-2G illustrate further examples of performing described techniques, including automatically determining repair status information in response to natural language queries for computing devices or other types of repair status information.

Figure 2A:
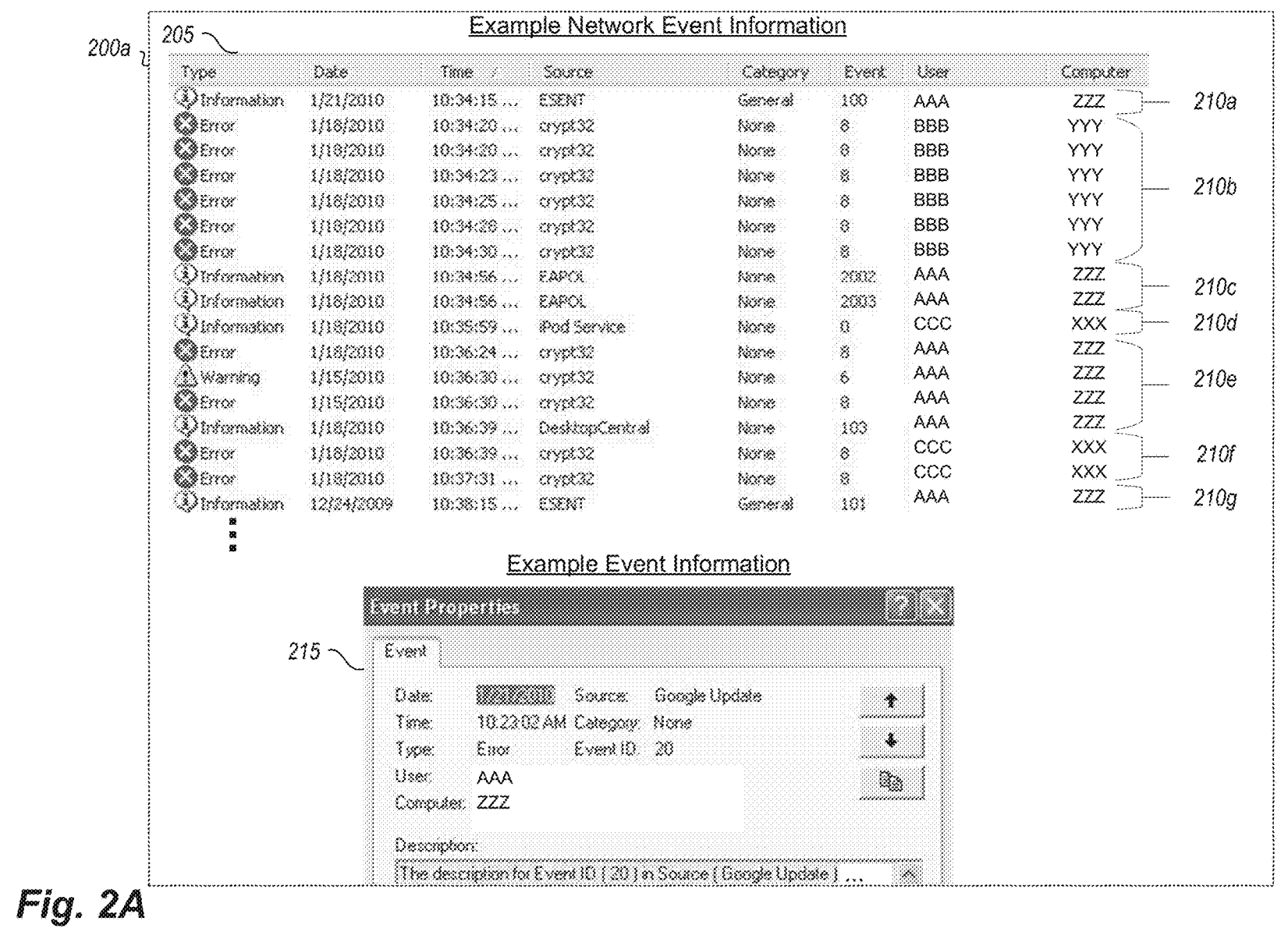

With respect to FIG. 2A, it illustrates example information 200a corresponding to network event information that may indicate repair problems and/or associated repair activities for one or more computing devices. In particular, information 205 illustrates example network event information (e.g., from an event log), which in this example may be separated into various encounters 210a-210g corresponding to different associated computing device entities XXX, YYY and ZZZ with associated user entities CCC, BBB and AAA, respectively. It will be appreciated that some encounters 210 correspond to a single event, such as for encounter 210a, while other encounters may correspond to a series of related events, such as for encounter 210b. Information 215 further provides example additional data available for each of some or all of the events, such as to include information about an associated time (in this case, with both a date and a time of day), a type, a unique ID, a source, descriptive text, etc.—it will be appreciated that the types of event information may vary in other embodiments and situations, and may be formatted in different manners than is illustrated.

FIG. 2B continues the example of FIG. 2A, and illustrates additional example information 200b about repair activities performed for a particular associated computing device entity, and in particular illustrates example maintenance activities performed for that computing device. In this example, the maintenance activities may be separated into multiple encounters 220a-220d corresponding to different associated repair/maintenance sessions, with some such encounters 220 corresponding to a single repair activity, such as for encounter 220a, while other encounters may correspond to multiple related repair activities, such as for encounter 220d. In this example, a provider of the repair activities is not identified, and may correspond to a single provider, although in other embodiments and situations multiple providers may perform different repair activities (e.g., at different times) for the associated computing device.

FIG. 2C continues the examples of FIGS. 2A-2B, and illustrates additional example information 200c about repair activities performed for a particular associated computing device entity by a particular provider of repair activities, and in particular is part of an invoice generated by that provider in this example. Information 200c in this example includes various structural elements and associated sections, such as with the "Details" section including overview information, a "From" section including information about the provider, a "Bill To" section including information about the recipient (e.g., a user or company associated with the computing device), a table section "Service" that provides structured data about repair activity services performed in a tabular format, a table section "Parts/Materials" that provides structured data about repair objects (in this case parts and materials) used as part of the repair activity services, a "Notes" section that provides handwritten information with further details about the repair activities performed, etc.

While various example information has been provided in FIGS. 2A-2C related to types of repair information that may be available and used for computing device entities, it will be appreciated that other types of repair information may be available and used in other embodiments.

Figure 2D:
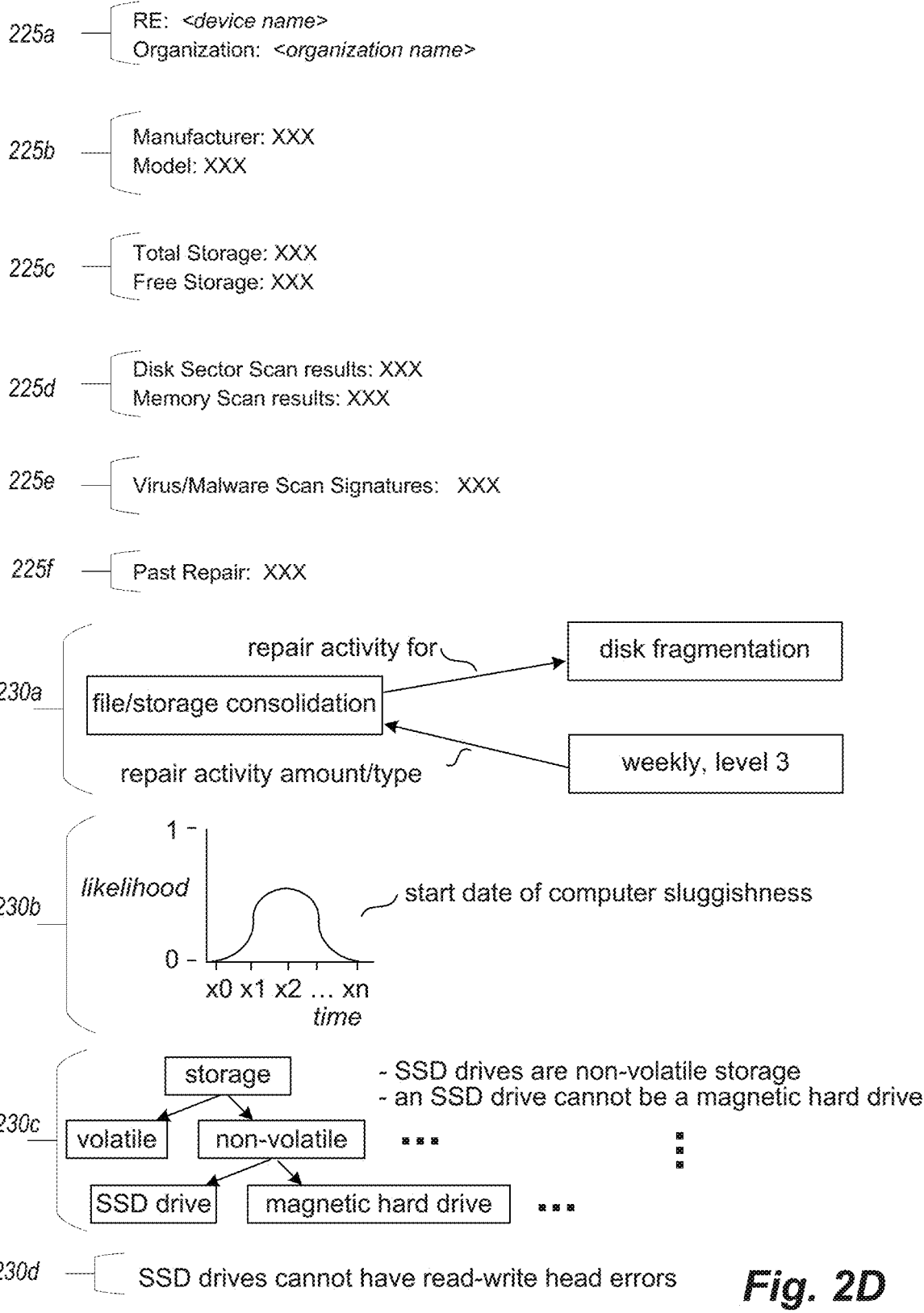

FIGS. 2D-2E continue the examples of FIGS. 2A-2C, and illustrate example data 225 and 230 that may be extracted and linked from various input documents, including in this example to have general information 225a, key-value pairs 225b, test results 225c, procedures performed 225d (and resulting information), repair information 225e, repair history information 225f, etc. Extracting repair data corresponding to an associated entity (e.g., the device or other entity on which the repair activities are performed) may include identifying particular repair activities performed and corresponding results for a particular associated device or other entity, including to determine values for particular attributes of the associated device or other entity. Entities and relationships may be generated (e.g., based on co-occurrence in the same row of a table or by analyzing the database schema), as shown in information 230a of FIG. 2D. Information 230b of FIG. 2D further illustrates an example of a time probability function used to represent a time associated with an event entity. Information 230c of FIG. 2D further illustrates one example of a small portion of a graph database in which inferred and/or predefined relationship information is illustrated, and/or to represent subsumption and sibling relationships (e.g., determined from existing ontology information that is imported by the ARSD system)—it will be appreciated that an actual graph database representing input information about one or more computing devices will further include a variety of device-specific information. Information 230d of FIG. 2D illustrates one example of a rule used for validation of data input from the information in the input documents and the determination of corresponding inconsistencies (e.g., with respect to relationships, associated time data, etc.). Information 235a-235c of FIG. 2E further illustrates examples of queries of multiple types that may be received and responded to using stored information that is encoded from the input information.

Figure 2F:
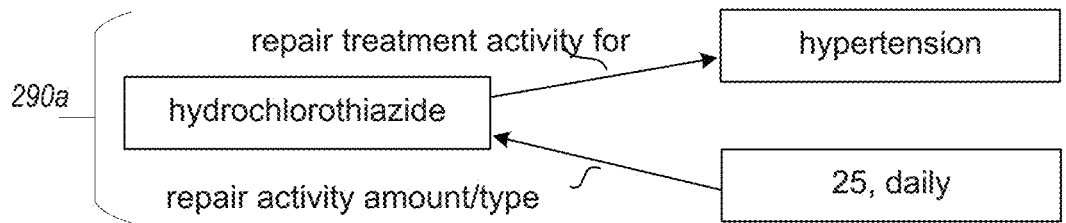
Figure 2F:
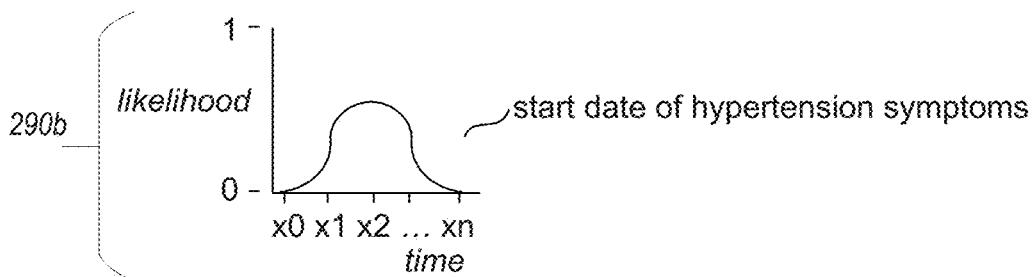
Figure 2F:
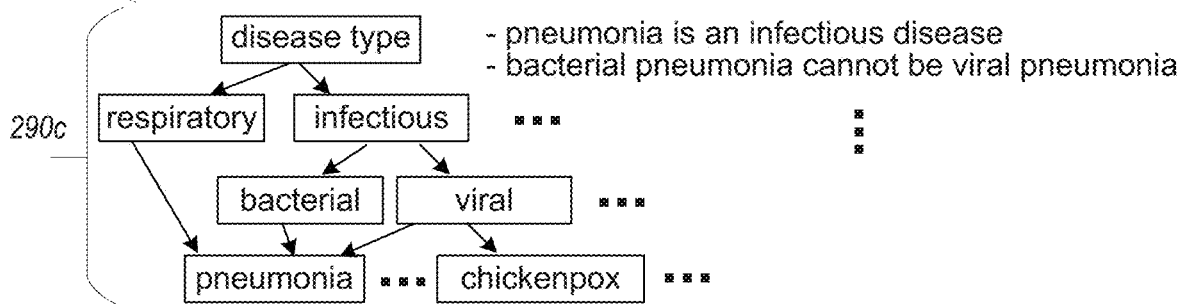

FIG. 2F continues the examples of FIGS. 2A-2E, and illustrates example data 285a-285f that may be extracted and linked from various medical documents, including in this example to have general information 285a, key-value pairs 285b, test results 285c, medical procedures performed 285d (and resulting information), medications 285e, medical history information 285f, etc. Extracting repair data corresponding to an associated entity (e.g., the patient or other entity on which the repair activities are performed) may include identifying particular repair activities performed and corresponding results for a particular associated patient or other entity, including to determine values for particular attributes of the associated patient or other entity.

As one non-exclusive example, the medical documents may include free text documents (e.g., clinical notes, discharge reports, nursing notes, radiology reports, etc.) and/or one or more sets of structured data (e.g., a list of result values linked to a single laboratory request. such as from a laboratory information management system) for one or more human patient entities or other entities, some or all of which are each associated with a time value (e.g., with different levels of granularity, such as from a date to milliseconds) and with at least one patient identification value or other entity identification value (e.g., unique identifiers, optionally with multiple separate identifiers being used for a single patient or other entity, such as by different medical service providers or related entities)—in addition, if different medical documents from different sources (e.g., hospitals, clinics, medical offices, laboratories, etc.) use the same identifier for different entities, the ARSD system may further manage such identifiers separately for the different entities (e.g., using a combination of provider and identifier as an entity identification value, by changing the identifier value for some or all such different entities to be unique, etc.). The ARSD system may further support various types of structured data and related standards (e.g., using formats and/or standards such as HL7, or Health Leven Seven; FHIR, or Fast Healthcare Interoperability Resources; OMOP, or Observational Medical Outcomes Partnership: etc.) used to store and communicate electronic medical record information.

Continuing with the non-exclusive example embodiment, and with respect to classification and semantic tagging of the information in the medical documents, the ARSD system may, for unstructured data (e.g., clinical notes), use one or more pretrained natural language processing models that classify a clinical document by its type (e.g., nursing note, evolution note, pathology report, list of medications, etc.) and/or identify different sections within a single document (e.g., Subjective, Objective, Assessment and Plan sections in a clinical SOAP note; "Family History" and "Medication List" from a discharge note; etc.). The one or more pretrained natural language processing (NLP) models (e.g., Bert, or Bidirectional Encoder Representations from Transformers) may further be used in combination with one or more cognition models and/or clustering techniques (e.g., using one or more KD, or K-dimensional, trees), such as with vector representations optionally used by the NLP model(s) and/or clustering techniques. In addition, the ARSD system may, for structured data (e.g., electronic medical records in tabular format), map table names and table columns (e.g., based on semantic similarity and/or edit distance, such as using Levenshtein distance) against biomedical terminologies—for example, a column named "Sys-BlodPress" and another column named "SBP" may be mapped to the SNOMED (Systematized Nomenclature Of MEDicine) concept "Systolic Blood Pressure:: 271649006". One or more NLP models may further optionally be used to do further processing (e.g., acronym disambiguation and expansion, spell checking, neuromachine translation, lemmatization and stemming, etc.). The ARSD system may also optionally use value-based rules for disambiguation during semantic tagging such as, for example, if a column named "SBP" is determined by semantic similarity (e.g., using embedded mediated techniques) to refer to "Systolic Blood Pressure" but all values are between 0 and 1 (when the range of acceptable systolic blood pressure has been defined by a rule as, for example, 50 to 250) that column will instead not be used to represent Systolic Blood Pressure.

Continuing with the non-exclusive example embodiment, and with respect to extraction of data groupings from the information in the medical documents, the ARSD system may, for unstructured data (e.g., in a natural language format), perform four tasks (e.g., in a sequence), including entity recognition, entity assertion, entity resolution (e.g., against controlled vocabularies), and entity relationship extraction. The entity recognition task may include, for example, using a name entity recognition deep learning model trained to assign a semantic type (e.g., "disease", "symptom", "medication", "dosage", "others", etc.) for every token (e.g., word) in a text sequence—the task may, for example, include using a lookup table (e.g., based on GloVe, or Global Vectors for Word Representation) for fast processing and/or an NLP model (e.g., Bert) for greater accuracy but using additional time. The entity assertion may include, for example, using a deep learning model that is trained to classify some or all entities (e.g., excluding a catchall "others" class), such as "negation", "hypothesis", "relative to other person", "confirmation", etc.—for example, if a text says "The patient does not have schizophrenia", entity "schizophrenia" is identified to have a "negated" relationship for that segment of text, such as with respect to the patient entity. The entity resolution may include, for example, using a model that is trained to, given a controlled vocabulary of reference (e.g., using the International Classification of Diseases, such as ICD-10) and a previously identified entity (e.g., the chunk "pulmonary hypertension" identified as "Disease"), select and rank the elements of the controlled vocabulary that are semantically closest to that chunk—in this example, the processing may assign the chunk "pulmonary hypertension" to the ICD-10 code "127.20 Pulmonary hypertension, unspecified". The entity relationship extraction for unstructured data may include, for example, using one or more models trained to establish relationships between different entities found in the text—for example, if the source states that "the patient is on ibuprofen 500 mg to treat his pain" and the entities "ibuprofen (drug)" and "500 mg (dosage)" and "pain (disease)" have been identified previously, this model is able to add a relationship of "treatment for" between "ibuprofen" and "pain" and a relationship of "dosage of" between "500 mg" and "ibuprofen", as well as to associate all of that information with that patient. The entity relationship extraction for structured data (e.g., a table with prescription data) may include, for example, using semantic column resolution as a first step, in a manner similar to the semantic tagging discussed above, but using a smaller list of "semantic classes" rather than a whole controlled vocabulary of hundreds or thousands of concepts (e.g., similar to the list of semantic classes of trained NLP name entity recognizers)—for example, if a first column is named "SysBloodPress" and a second column is named "Temperature", a semantic type assigned to both may be "clinical_measure", but during classification and semantic tagging the first column may be mapped to "Systolic Blood Pressure" and the second column to "Temperature". A second step may include assigning relationships between the different values found in different columns and/or tables based on a database schema in use—for example, if a database is among the input information with the following tables:

| Table diagnoses: | | | |
|---|---|---|---|
| UID | Patient ID | Date | Diagnosis |
| 1 | 1 | 2018 Jan. 3 | Hypertension |
| 2 | 1 | 2019 Apr. 5 | Anemia |

| Table prescriptions: | | | | | |
|---|---|---|---|---|---|
| UID | Patient ID | Date | Medication | Dosage (mg) | Diag_uid |
| 1 | 1 | 2018 Feb. 5 | Losartan | 20 | 1 |
| 2 | 1 | 2019 Jan. 2 | Hydrochlorothiazide | 25 | 1 |

| The following semantics may be generated | | |
|---|---|---|
| Table | Column | Class |
| diagnoses | Date | Date |
| diagnoses | Diagnosis | Disease |
| prescription | Date | Date |
| Prescription | Medication | Drug |
| Prescription | Dosage(mg) | Dosage | and the entities and relationships shown in information 290a of FIG. 2F may be generated (e.g., based on co-occurrence in the same row of a table or by analyzing the database schema).

Continuing with the non-exclusive example embodiment, and with respect to temporal attribution for the information in the medical documents, the ARSD system may represent a sequence of data for a single patient along a timeline by assigning a time value for every piece of data. For example, the ARSD system may determine an overall time for a document or other group of information, and initially assign that overall time to each piece of data extracted from that group of information—however, some data pieces (often in unstructured data and/or freeform text) have time references expressed in a relative manner (e.g., "she presents fever since 2 weeks ago", "anemia during his infancy", "pain for several days", etc.) and/or lacking detail or specificity (e.g., "the patient was diagnosed of cancer in 2021", etc.), and the ARSD system may use one or more entity recognizers that are trained to identify different time references and units and to match corresponding information (e.g., natural language time expressions) to time periods (e.g., combining a relative time reference such as "two days ago" with an overall current date for the associated document or other group of information such as 2020 Jan. 15 to infer that "two days ago" means 2020 Jan. 13). In addition, in order to represent time references in a systematic manner, the ARSD system may further generate a probability function for some or all pieces of data (e.g., a probability function whose area totals 1 with the timeline being the abscissa, or horizontal "X", axis). A simplex approach can be used in which a probability of 1 is assigned to the median second of the time period associated with that piece of data—for example, if the overall initial time is expressed as a day such as 2022 Feb. 1, the time probability of that data piece would be of 1.0 (100%) for the 2022 Feb. 1 12:00:00 second, while if the overall initial time is expressed as a year the time probability of that data piece would be assigned to be 1.0 during the 2021 Jul. 2 12:00:00 second (middle second of the middle day of the year), etc. Alternatively, the ARSD system can instead (e.g., based on its configuration) apply a homogeneous probability (e.g., a rectangular probability distribution) along the time unit expressed in the document or other group of input information—for example, if the source time is expressed as a day such as 2022 Feb. 1 and given that a single day has 86,400 seconds, a probability of $1/86400$ will be assigned to every second of that day so that the sum of probabilities for that day is equal to 1. For less specific time references (e.g., "many days ago", "during his infancy", "some time ago", etc.), the ARSD system may use one or more time probability functions (e.g., normal distribution, continuous Bernoulli distribution, Kumaraswamy distribution, Log-normal distribution, etc.) to represent different time uncertainty patterns, with information 290b of FIG. 2F illustrating one example of such a time probability function.

Continuing with the non-exclusive example embodiment, and with respect to storing extracted data from the medical documents, the ARSD system may store the extracted data in a graph database (e.g., Neo4j). In particular, the ARSD system may determine a graph schema to use that represents possible entity classes and relations between them, such as by inferring the different entities and relationships based on what has been observed in the information being input (e.g., relationships found by NLP-based entity relation extractor models and/or in original input structured database schemas), and/or by predefining at least some such valid relationships and entities before analysis of a group of information to be analyzed. Time probability functions and relationship assertions (e.g., confirmed, negated, hypothesis, etc.) are also stored along with data pieces and relationships. Information 290c of FIG. 2F illustrates one example of a small portion of such a graph database in which inferred and/or predefined relationship information is illustrated—it will be appreciated that an actual graph database representing input information will further include a variety of patient-specific information. The use of such a graph database enables relationships to be explicitly modeled and used, and provides various benefits as discussed elsewhere herein.

Continuing with the non-exclusive example embodiment, and with respect to validation of data input from the information in the medical documents and the determination of corresponding inconsistencies (e.g., with respect to relationships, associated time data, etc.), the ARSD system may use an ontology reasoner with a set of rules (e.g., tens of rules, hundreds of rules, thousands of rules, etc.) to determine if there are pieces of data whose entity-entity relationships and/or entity-entity co-occurrence (e.g., time-based co-occurrence restrictions) are inconsistent with the rules. For example, rules may have forms such as "a patient cannot have a menopause status and a pregnancy status at the same time", "a patient with a female status cannot have prostate cancer at any time", "a patient with a previous cholecystectomy cannot have a new cholecystectomy later on" (as once the gallbladder has been removed it cannot be removed anymore), etc., with information 290d of FIG. 2F illustrating one example of such a rule. In addition, ontologies stored in a graph format (e.g., SNOMED or ICD-10 controlled vocabularies) may be imported and used for the generation of some subsumption and sibling relationships in at least some embodiments—for example, inclusion of such an ICD-10 graph may automatically produce a subsumption rule such a "a pneumonia is an infectious disease", "a pneumonia is a respiratory disease" and a siblings exclusion rule that "a bacterial pneumonia cannot be a viral pneumonia", with similar information 290c illustrated in FIG. 2F. When a new group of data pieces is loaded into the graph database, the ontological rules may be used to determine and report inconsistencies (e.g., to an operator user of the ARSD system, optionally along with a list of possible solutions).

Continuing with the non-exclusive example embodiment, and with respect to using stored information to answer natural language queries, the ARSD system may receive and respond to various types of queries—for example, the system may support at least queries related to entity relationships (e.g., "what are the most frequent enalapril dosages used for the treatment of hypertension in comparison with the treatment of chronic heart failure"?), queries related to groups (or "cohorts") of patients sharing one or more common attributes or otherwise satisfying one or more specified criteria (e.g., corresponding to one or more of a time-based criteria, such as "patients with heart attacks registered between 2019 and 2021"; inclusion criteria, such as "males, over 65 years old at Jan. 1, 2019 with a diagnosis of hypertension"; exclusion criteria, such as excluding or not including "patients in treatment with losartan"; etc.), queries related to specific patients (e.g., "is patient XXX allegoric to aspirin" or "when did this patient have a prescription for WWW"), etc. Information 295a-295c of FIG. 2G illustrates examples of such queries. For a query that is not specific to one or more particular patients, the ARSD system may convert the query into a graph database format, and use the converted query to determine and provide a list or other grouping of information about a group of one or more patients that match the query (e.g., in a graph format and/or a relational database format, such as using an OMOP schema). To support such natural language queries, the ARSD system may, for example, train and use an NLP transformer model (e.g., sequence to sequence)—in some embodiments, an existing language model (e.g., T5, GPT2, GPT3, etc.) is adapted for the specific task of transforming a natural language query into the query language of the graph database (e.g., Cypher for the case of Neo4j), such as by using a list of paired natural language queries and corresponding graph database queries.

Non-exclusive examples of types of data that may be extracted from medical records in at least some embodiments include one or more of the following:

| Patient Information |
| --- |
| Age |
| Fetus Or Newborn |
| Birth |
| Gender |
| Race Or Ethnicity |
| Social Determinant Of Health |
| Employment Status |
| Relationship Status |
| Sexual Orientation |
| Female Reproductive Status |
| Alcohol Intake |
| Smoking |
| Medical Family History |
| Medical Record |
| Clinical Department |
| Medical Record Section Header |
| Medical History Header |
| Vital Signs Header |
| Temporal |
| Date |
| Relative Date |
| Time |
| Relative Time |
| Oncology |
| Oncological Disease |
| Tumor Finding |
| Cancer Staging |
| Cancer Modifier |
| Metastasis |
| Diseases |
| Disease Or Syndrome Or Disorder |
| Symptom |
| Clinical Modifier |
| Injury Or Poisoning |
| Psychological Condition |
| Overweight |
| Obesity |
| Kidney Disease |
| Diabetes |
| Cerebrovascular Disease |
| Hyperlipidemia |
| Heart Disease |
| Communicable (Infectious) Disease |
| Hypertension |
| Death |

| Maternal Health |
| --- |
| Pregnancy |
| Labor Delivery |
| Puerperium |
| Clinical Measurements |
| Weight |
| Height |
| Body Mass Index |
| Blood Pressure |
| Respiration |
| Temperature |
| O2 Saturation |
| Pulse |
| Triglycerides |
| HDL Cholesterol |
| LDL Cholesterol |
| Total Cholesterol |
| Medical Tests |
| Medical Test |
| Medical Test Findings |
| Imaging Medical Test |
| Imaging Medical Test Findings |
| Electrocardiogram Findings |
| Medical Procedures And Treatments |
| Treatment |
| Medical Procedure |
| Oncology Therapy |
| Oxygen Therapy |
| Diet |
| Vaccine |
| Allergen |
| Medical Device |
| Medication Information |
| Drug Brand Name |
| Drug Ingredient |
| Substance |
| Substance Quantity |
| Drug Strength |
| Dosage |
| Route Of Administration |
| Drug Form |
| Drug Frequency |
| Drug Duration |
| Anatomical |
| External Body Part |
| Internal Organ |
| Direction |
| Patient Information |
| Age |
| Fetus Or Newborn |
| Birth |
| Gender |
| Race Or Ethnicity |
| Social Determinant Of Health |
| Employment Status |
| Relationship Status |
| Sexual Orientation |
| Female Reproductive Status |
| Alcohol Intake |
| Smoking |
| Medical Family History |

Non-exclusive examples of types of documents from which medical data may be extracted in at least some embodiments include one or more of the following:

| Document Type |
| --- |
| Alcohol And/Or Substance Abuse Service Attachment |
| Ambulance Records |
| Ambulatory Cardiac Rhythm Monitor (Holter) Study |
| Anesthesia Records |
| Anoscopy Study |
| Arthroscopy Study |
| Attending Discharge Summary |
| Attending Initial Evaluation Note |
| Attending Progress Note |
| Audiology Study |
| Autopsy Report |
| Bronchoscopy Study |
| Cancer Related Multigene Analysis In Plasma Cell-Free DNA By Molecular Genetics Method |
| Cardiac Catheterization Study |
| Cardiac Electrophysiology Study |
| Cardiac Service Attachment |
| Cardiac Stress Study Procedure |
| Chemotherapy Records |
| Chiropractic Episode Of Care Medical Records |
| Chiropractic Medicine Initial Evaluation Note |
| Chiropractic Medicine Progress Note |
| Colonoscopy Study |
| Colonoscopy Study Through Stoma |
| Colposcopy Study |
| Consult Note |
| Consultant Initial Evaluation Note |
| Consultant Progress Note |
| Courtesy Consultation Document |
| Critical Care Records |
| Ct Study |
| Dentist Operation Note |
| Dentistry Discharge Summary |
| Dentistry Initial Evaluation Note |
| Dentistry Note |
| Dentistry Procedure Note |
| Dentistry Progress Note |
| Diagnostic Imaging Study |
| Dialysis Records |
| Discharge Summary |
| EEG Study |
| EGD Study |
| EKG Study |
| Electromyogram Study |
| Emergency Department Medical Records |
| Emergency Department Progress Note |
| Endoscopy Study |
| Enteroscopy Study |
| Enteroscopy Study Through Stoma |
| ERCP Study |
| Esophagoscopy Study |
| Exercise Stress Test Study |
| Eye Ultrasound Study |
| Flexible Sigmoidoscopy Study |
| Heterophoria Study |
| Hospice Care Note |
| Hospital Consultations Document |
| Initial Evaluation Note |
| Labor And Delivery Records |
| Laboratory Report |
| Medical Records |
| Medical Social Services Attachment |
| Mg Breast Study |
| Mr Study |
| Neonatal Intensive Care Records |
| Nerve Conduction Study |
| Nuclear Medicine Study |
| Nurse Initial Evaluation Note |
| Nurse Practitioner Initial Evaluation Note |
| Nurse Practitioner Progress Note |
| Nurse Progress Note |
| Nurse Transfer Note |
| Nursery Records |
| Nystagmogram Study |
| Occupational Therapy Episode Of Care Medical Records |
| Occupational Therapy Initial Evaluation Note |
| Occupational Therapy Note |
| Occupational Therapy Progress Note |
| Occupational Therapy Service Attachment |

| Document Type |
| --- |
| Outpatient Consultation 2nd Opinion |
| Pathology Study |
| Perimetry Study |
| Perioperative Records |
| Peritoneoscopy Study |
| Physical Therapy Episode Of Care Medical Records |
| Physical Therapy Initial Evaluation Note |
| Physical Therapy Note |
| Physical Therapy Progress Note |
| Physical Therapy Service Attachment |
| Physician Discharge Summary |
| Physician Emergency Department Note |
| Physician Episode Of Care Medical Records |
| Physician History And Physical Note |
| Physician Initial Evaluation Note |
| Physician Procedure Note |
| Physician Transfer Note |
| Physician, Operation Note |
| Plan Of Care Note |
| Podiatry Episode Of Care Medical Records |
| Podiatry Initial Evaluation Note |
| Podiatry Operation Note |
| Podiatry Procedure Note |
| Podiatry Progress Note |
| Polysomnography (Sleep) Study |
| Portable Xr Study |
| Procedure Note |
| Progress Note |
| Provider-Unspecified, History And Physical Note |
| Psychiatric Service Attachment |
| Psychiatry Initial Evaluation Note |
| Psychiatry Note |
| Psychiatry Progress Note |
| Psychiatry Study |
| Psychology Episode Of Care Medical Records |
| Psychology Initial Evaluation Note |
| Psychology Progress Note |
| Replacement Of Percutaneous Gastrojejunostomy Upper GI Tract Document |
| Respiratory Therapy Service Attachment |
| Radiographic Fluoroscopy Study |
| Social Service Episode Of Care Medical Records |
| Social Worker Initial Evaluation Note |
| Social Worker Note |
| Social Worker Progress Note |
| Spect Study |
| Speech Therapy Episode Of Care Medical Records |
| Speech Therapy Service Attachment |
| Speech-Language Pathology Initial Evaluation Note |
| Speech-Language Pathology Note |
| Speech-Language Pathology Progress Note |
| Spirometry Study |
| Surgical Operation Note |
| Surgical Pathology Study |
| Temperature Charts |
| Tonometry Study |
| Transfer Summary Note |
| Ultrasound Study |
| Visual Acuity Study |
| X Ray Study |

Non-exclusive examples of types of document sections from which medical data may be extracted in at least some embodiments include one or more of the following:

| Document Sections |
| --- |
| Advance Directives |
| Allergies And Adverse Reactions Document |
| Chief Complaint Narrative - Reported |
| Complications Document |
| Discharge Diet (Narrative) |
| Evaluation Note |
| Functional Status Assessment Note |
| History General Narrative - Reported |
| History Of Family Member Diseases Narrative |
| History Of Hospitalizations + Outpatient Visits Narrative |
| History Of Immunization Narrative |
| History Of Medical Device Use |
| History Of Medication Use Narrative |
| History Of Past Illness Narrative |
| History Of Present Illness Narrative |
| History Of Procedures Document |
| Hospital Admission Diagnosis Narrative - Reported |
| Hospital Consultations Document |
| Hospital Course Narrative |
| Hospital Discharge Dx Narrative |
| Hospital Discharge Instructions |
| Hospital Discharge Medications Narrative |
| Hospital Discharge Physical Findings Narrative |
| Hospital Discharge Studies Summary Narrative |
| Instructions |
| Medication Administered Narrative |
| Medications On Admission (Narrative) |
| Objective Narrative |
| Payment Sources Document |
| Physical Findings Narrative |
| Physical Findings Of General Status Narrative |
| Plan Of Care Note |
| Planned Procedure Narrative |
| Postprocedure Diagnosis Narrative |
| Problem List Narrative - Reported |
| Procedure Disposition Narrative |
| Procedure Estimated Blood Loss Narrative |
| Procedure Findings Narrative |
| Procedure Implants Narrative |
| Procedure Indications [Interpretation] Narrative |
| Procedure Narrative |
| Procedure Specimens Taken Narrative |
| Reason For Referral (Narrative) |
| Reason For Visit Narrative |
| Relevant Diagnostic Tests/Laboratory Data Narrative |
| Review Of Systems Narrative - Reported |
| Social History Narrative |
| Subjective Narrative |
| Subjective Narrative |
| Surgical Drains Narrative |
| Surgical Operation Note Fluids Narrative |
| Surgical Operation Note Implants Narrative |
| Surgical Operation Note Postoperative Diagnosis Narrative |
| Surgical Operation Note Postoperative Diagnosis Narrative |
| Surgical Operation Note Surgical Complications [Interpretation] Narrative |
| Surgical Operation Note Surgical Procedure Narrative |
| Vital Signs |

Non-exclusive examples of types of NLP models that may be used in at least some embodiments include one or more of the following:

| |
| --- |
| Albert Embeddings |
| Bert Embeddings |
| Deberta Embeddings |
| Distilbert Embeddings |
| Elmo Embeddings |
| Gpt2 Transformer |
| Longformer Embeddings |
| Roberta Embeddings |
| T5 Transformer |
| Universal Sentence Encoder |
| Xlmroberta Embeddings |
| Xlnet Embeddings |

Non-exclusive examples of types of cognition models that may be used (e.g., for classification and/or semantic tagging, optionally in combination with one or more NLP models) in at least some embodiments include one or more of the following:

| |
|---|
| Albert Embeddings |
| Bert Embeddings |
| Deberta Embeddings |
| Distilbert Embeddings |
| Elmo Embeddings |
| Gpt2 Transformer |
| Longformer Embeddings |
| Roberta Embeddings |
| T5 Transformer |
| Universal Sentence Encoder |
| XImroberta Embeddings |
| XInet Embeddings |

Non-exclusive examples of types of clustering techniques that may be used in at least some embodiments (e.g., in combination with one or more NLP models) include one or more of the following:

| |
|---|
| K-Means |
| Affinity Propagation |
| Spectral Clustering |
| Ward Hierarchical Clustering |
| Agglomerative Clustering |
| Dbscan |
| Optics |
| Gaussian Mixtures Clustering |
| Birch Algorithm |
| Bisecting K-Means |
| Mean-Shift Clustering |

With respect to using one or more language models, each such language model may, in at least some embodiments, be a deep learning model (e.g., based on transformer architecture) that is trained in an unsupervised manner (e.g., with a target task to predict the occurrence of a next word or next sentence or to predict randomly masked words) over very large text corpora. Such language models may thus be able to represent, by a list of numbers (embeddings), any new content provided to them in such a way that similar content (semantically considered) will have similar embeddings (dot product of the embeddings array tend to be higher when both contents are semantically similar). That characteristic provides a vector space semantic representation of any arbitrary textual content, allowing classical clustering algorithms to be applied (e.g., based in difference vector distances as Euclidean or Cosine distances).

With respect to using one or more embedding models, each such language model may, in at least some embodiments, be of one of two types. One type of embedding model is based on lookup tables and generate a vocabulary based on the tokens found in a corpus used during training, assigning a single embedding to every token, and with a single token represented by the same embedding (array of values), thus making the retrieval of the embedding of that token a simple lookup table query. Another type of embedding model is context-aware, with the calculation of an embedding of a token being performed so as to take into account the context (words that surround a particular token in that particular content), such that a single token (e.g., bank) may have different embedding representations depending on the context in which the token appears (e.g., "A dark bank of cloud loomed on the horizon" versus "I must go to the bank and change some money"), resulting in the embeddings representing content being more precise but slower to generate than using lookup tables. In addition, when classifying a token, an embedding model may provide a "confidence" value between 0 to 1 for a most probable label assigned to that token (e.g., a type of entity to which that token belongs, such as may be assigned by a softmax layer of the embedding model), such that the higher the confidence value, the more confident the model is when assigning the label, enabling such confidence values to be used to filter named entities recognized with a high confidence as reported by the model.

With respect to use of one or more models to extract data, non-exclusive examples are described in "Improving Clinical Document Understanding On COVID-19 Research With Spark NLP" by Veysel Kocaman et al. (Dec. 7, 2020, accessible at arXiv:2012.04005v1), and in "Neural Networks For Negation Scope Detection" by Federico Fancellu et al. (Aug. 7-12, 2016, Proceedings Of The 54th Annual Meeting Of The Association For Computational Linguistics), each of which is hereby incorporated by reference.

Non-exclusive examples of semantic general types that may be used in at least some embodiments when extracting data include one or more of the following:

| |
|---|
| Patient Information |
| Medical Treatment |
| Medical Problem |
| Medical Test |
| Temporal |
| Location |

It will be appreciated that questions and other queries in a medical domain may be of various types, such as related to a particular diseases or other medical conditions, particular medical symptoms, particular medicines and other treatments and other health-related activities involved in preventative actions or other actions to improve fitness and wellbeing, particular surgeries and other medical procedures, particular medical devices and other health-related objects used with respect to medical treatments and other health-related activities, particular patients or groups of patients, etc., and that the summarization and encoding of information for a medical domain may include identifying and encoding information about some or all such elements (e.g., diseases or other conditions, symptoms, treatments, medical procedures, medical devices and other health-related objects, patients, etc.). In addition, it will be appreciated that a variety of other types of information may be available and used in other embodiments, including to provide a response in a different format than is shown in the examples of FIGS. 2A-2G.

Various details have been provided with respect to FIGS. 2A-2G, but it will be appreciated that the provided details are non-exclusive examples included for illustrative purposes, and other embodiments may be performed in other manners without some or all such details.

In addition, in some embodiments, the automated operations of the ARSD system may further include encoding repair status information and/or associated queries in an additional manner, such as to encode content embedding vectors to represent some or all data groupings and to similarly encode additional embedding vectors that represent received natural language queries and are used to identifying similar content embedding vectors, to provide and use a trained validation model to evaluate each candidate data grouping and determine if that candidate data grouping is validated as including a responsive answer to the natural language query (e.g., without determining the particular answer that is present in a candidate content group validated to include a responsive answer), etc. Additional details related to embodiments of a system for generating and using such embedding vectors and associated techniques are included in co-pending U.S. Non-Provisional patent application Ser. No. 17/583,048, filed Jan. 24, 2022 and entitled "Determining Repair Instructions In Response To Natural Language Queries" (e.g., with respect to a described ARID system, and with some embodiments of the described ARSD system including some or all functionality of such an ARID system in at least some embodiments), each of which is incorporated herein by reference in its entirety.

Figure 3:
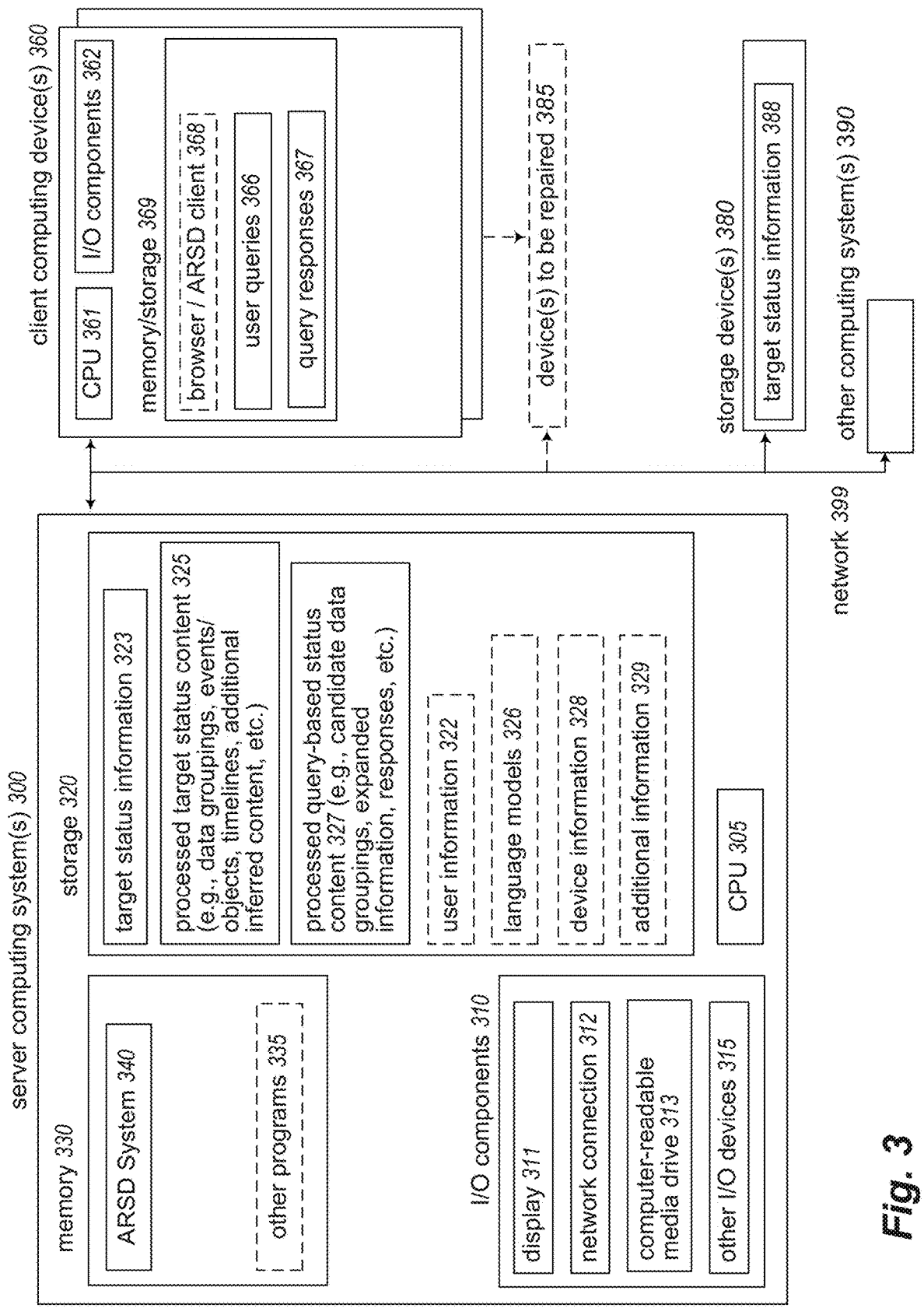
FIG. 3 is a block diagram illustrating an example of a computing system for use in performing described techniques, including automatically determining repair or maintenance status information in response to natural language queries for computing devices or other types of repair or maintenance status information.

FIG. 3 is a block diagram illustrating an embodiment of one or more server computing systems 300 executing an implementation of an ARSD system 340—the server computing system(s) and ARSD system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing ARSD system 340 may communicate with other computing systems and devices via one or more networks 399 (e.g., the Internet, one or more cellular telephone networks, etc.), such as user client computing devices 360 (e.g., used to supply queries; receive responses; and use the received response information, such as to implement automated repairs to associated devices 385 and/or to display or otherwise present response information to users of the client computing devices), optionally one or more devices 385 to be repaired (e.g., if the devices include networking capabilities or other data transmission capabilities), optionally other storage devices 380 (e.g., used to store and provide information for one or more target domains/repair areas), and optionally other computing systems 390.

In the illustrated embodiment, an embodiment of the ARSD system 340 executes in memory 330 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the ARSD system may include one or more components, not shown, to each perform portions of the functionality of the ARSD system, and the memory may further optionally execute one or more other programs 335. The ARSD system 340 may further, during its operation, store and/or retrieve various types of data on storage 320 (e.g., in one or more databases or other data structures, such as one or more graph databases, not shown), such as various types of user information 322, target status information 323 (e.g., local copies of some or all of status information 388 on remote systems such as storage devices 380; domain-specific information to use in customizing the encoding of content for a domain and/or other additional supplemental information; etc.), processed target status content 325 of one or more types (e.g., data groupings and associated enhanced and/or supplemental information, such as including timeline data, additional inferred content, etc., and optionally stored in one or more graph database formats in one or more graph databases), processed query-based status content 327 (e.g., candidate data grouping candidates and associated information such as their expanded information, generated responses, etc.), optionally language models 326 to use in generating encoded content, optionally entity-specific information 328 (e.g., related to devices to be repaired or to other entities), and/or various other types of optional additional information 329.

Some or all of the user client computing devices 360 (e.g., mobile devices), devices 385 to be repaired, storage devices 380, and other computing systems 390 may similarly include some or all of the same types of components illustrated for server computing system 300. As one non-limiting example, the computing devices 360 are each shown to include one or more hardware CPU(s) 361, I/O components 362, and memory and/or storage 369, with a browser and/or ARSD client program 368 optionally executing in memory to interact with the ARSD system 340 and present or otherwise use query responses 367 that are received from the ARSD system for submitted user queries 366. While particular components are not illustrated for the other devices/systems 380 and 385 and 390, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ARSD system 340 may in some embodiments be distributed in various components, some of the described functionality of the ARSD system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ARSD system 340 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
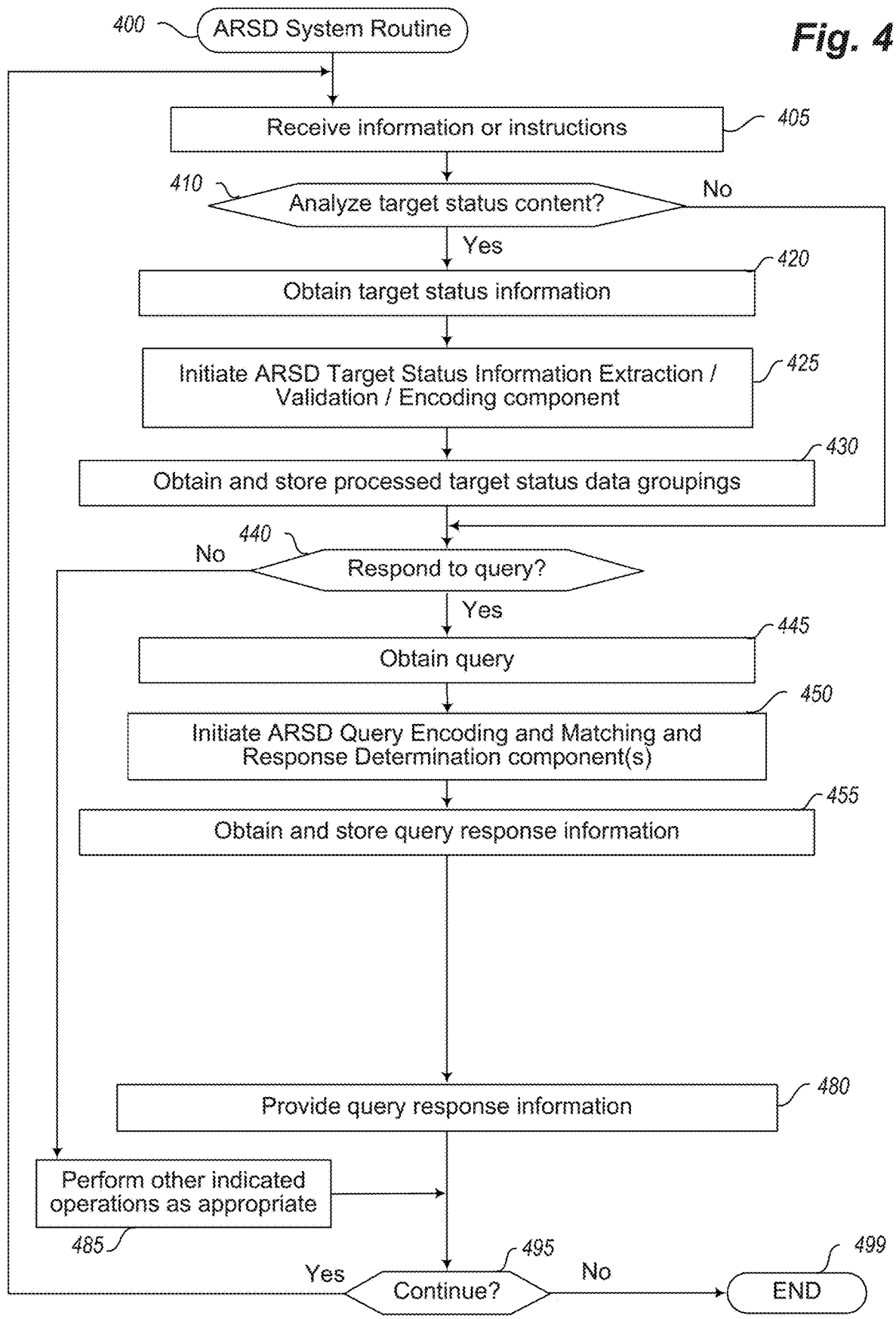
FIG. 4 illustrates a flow diagram of an example embodiment of an Automated Repair Status Determination ("ARSD") system routine.

FIG. 4 is a flow diagram of an example embodiment of an ARSD system routine 400. The routine may be provided by, for example, execution of the ARSD system 140 of FIGS. 1A and 1B, and/or the ARSD system 340 of FIG. 3, and/or corresponding functionality discussed with respect to FIGS. 2A-2G and elsewhere herein, such as to automatically determine responses (e.g., repair status information or related information) in response to natural language queries (e.g., with respect to computing devices or other devices, with respect to medical information, etc.). In the illustrated embodiment, the routine analyzes information about one or more domains of interest at various times (e.g., about one or more devices or other entities, from one or more service providers, etc.), such as to pre-process information about a particular domain (e.g., as instructed by a human operator of the ARSD system, as requested by a third-party entity, etc.) to determine at least some types of domain-specific information for use in responding to later queries based on such information, while in other embodiments the routine may instead dynamically generate some or all types of domain-specific information in response to requests from users or other entities in at least some situations.

In the illustrated embodiment, the routine 400 begins at block 405, where instructions or other information is received. The routine continues to block 410, where it determines if the instructions or other information received in block 405 are to analyze target status content, such as for a target repair status area or other target domain, and if so continues to block 420 where it retrieves or otherwise obtains the target status information (e.g., uses information received in block 405) to be analyzed (e.g., multiple documents that are part of information for the target domain). In block 425, the routine then initiates execution of an ARSD Target Status Information Extraction/Validation/Encoding component routine to summarize and encode information from the target domain (along with an indication of that target domain), such as corresponding to component 142 of FIGS. 1A and 1B, and with one example of a corresponding routine for performing such activities discussed further in FIG. 5. In block 430, the routine then receives the processed target status information data groupings from block 425, and stores the information for subsequent use. It will be appreciated that, while the routine indicates proceeding to block 430 immediately after block 425, in other embodiments the routine may operate in an asynchronous manner such that other operations are performed (e.g., corresponding to handling another set of instructions or information that are received in block 405, such as from a different user or other entity) while waiting for a response from block 425, and that the operations of block 425 may be performed in a substantially immediate manner (e.g., less than one second, less than 10 seconds, less than one minute, etc.) in at least some embodiments.

After block 430, or if it is instead determined in block 410 that the information or instructions received in block 405 are not to analyze content for a target repair status area or other target domain, the routine continues to block 440, where it determines if the information or instructions received in block 405 are to respond to a received query, and if not continues to block 485. Otherwise, the routine continues to block 445 where it obtains a query in natural language form (e.g., using information received in block 405), and then proceeds to block 450 to initiate execution of ARSD Query Encoding and Matching and Response Determination components' routines, such as to correspond to components 144, 146 and 148 of FIGS. 1A and 1B, and with one example of a corresponding routine for performing such activities discussed further in FIG. 6. In block 455, the routine then receives query response information from block 450, and stores the information for later use, with the query response information then provided in block 480 as a response to the received query. It will be appreciated that, while the routine indicates proceeding to block 455 immediately after block 450, in other embodiments the routine may operate in an asynchronous manner such that other operations are performed (e.g., corresponding to handling another set of instructions or information that are received in block 405, such as from a different user or other entity) while waiting for a response from block 450, and that the operations of block 450 may be performed in a substantially immediate manner (e.g., in a real-time or near-real-time manner, such as a fraction of a second, a second, less than 10 seconds, etc.) in at least some embodiments.

In block 485, the routine proceeds to perform one or more other indicated operations as appropriate, with non-exclusive examples of such other operations including retrieving and providing previously determined or generated information (e.g., previous user queries, previously determined responses to user queries, previously summarized and encoded content for one or more target domains, etc.), receiving and storing information for later use (e.g., information about one or more target domains, such as some or all of a corpus of documents for the domain, domain-specific labeled data groupings or other content for the domain, etc.), providing information about how one or more previous query responses were determined, performing housekeeping operations, etc.

After blocks 480 or 485, the routine continues to block 495 to determine whether to continue, such as until an explicit indication to terminate is received (or alternatively only if an explicit indication to continue is received). If it is determined to continue, the routine returns to block 405 to await further information or instructions, and if not continues to block 499 and ends.

Figure 5:
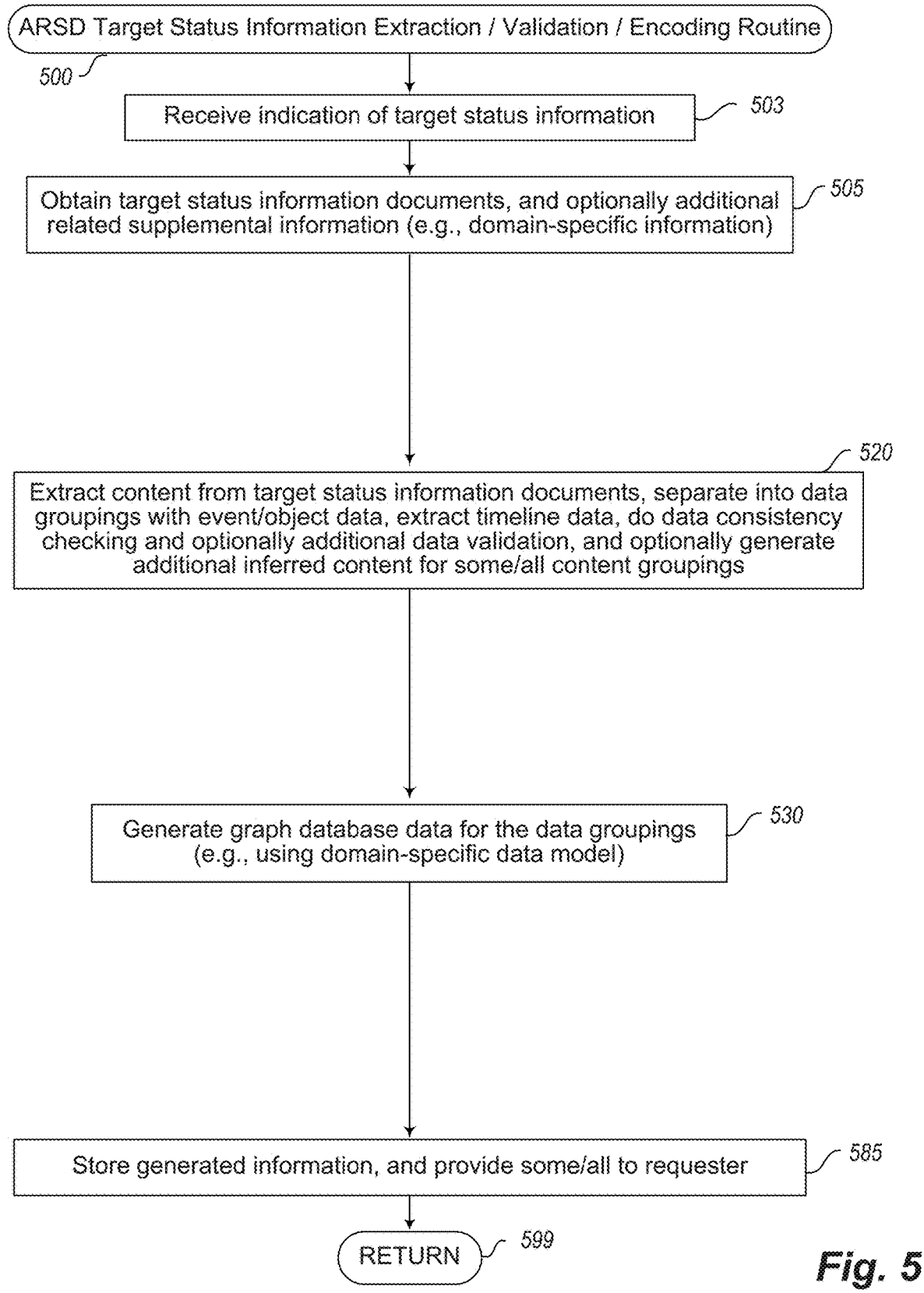
FIG. 5 illustrates a flow diagram of an example embodiment of an ARSD Target Status Information Extraction/Validation/Encoding component routine.

FIG. 5 is a flow diagram of an example embodiment of an ARSD Target Status Information Extraction/Validation/Encoding routine 500. The routine may be provided by, for example, execution of the ARSD Status Information Extraction/Validation/Encoding component 142 of FIGS. 1A-1B and/or a corresponding component (not shown) of the ARSD system 340 of FIG. 3 and/or with respect to corresponding functionality discussed with respect to FIGS. 2A-2G and elsewhere herein, such as to summarize and encode information from an indicated target domain. In addition, in at least some situations, the routine 500 may be performed based on execution of block 425 of FIG. 4, with resulting information provided and execution control returning to that location when the routine 500 ends. In this example, the routine 500 is performed with respect to an initial analysis of domain-specific content for a target domain (e.g., medical records and optionally other associated health-related information for one or more patients), but in other embodiments may be similarly performed to update previously analyzed information, such as to analyze additional documents that become available for a domain after a prior analysis of other documents and use of resulting information has been completed. Furthermore, in a manner similar to that of the other routines, the routine 500 may determine domain-specific information in advance of the use of that determined information, and/or dynamically in response to a request for such information.

The illustrated embodiment of the routine 500 begins at block 503, where an indication of target status information to be analyzed (e.g., an indication of a target domain that includes such target status information, particular documents with some or all of the target status information, etc.) is received. In block 505, the routine then obtains documents with information about the target domain and optionally additional domain-specific information (e.g., domain-specific labeled data groupings and/or other content, etc.), such as by using currently provided information about that domain information, using previously stored domain information and/or information about a location of such domain information, by searching for or otherwise dynamically identifying corresponding domain information, etc. In block 520, the routine then extracts the content from the target status information documents and separates the content into multiple data groupings, and optionally generates expanded data grouping information (e.g., with additional inferred content) for each data grouping—some or all such data groupings may include, for example, information about events and objects (and their attributes, if appropriate), about timelines, etc., and with the information of the data groupings validated via consistency checking and/or other operations.

In block 530, the routine then generates encoded information for the information from block 525, such as data groupings encoded for storage in one or more graph databases, optionally using one or more domain-specific data models. After block 530, the routine continues to block 585 to store the generated information for later use (e.g., in one or more such graph databases), and to optionally provide some or all of the generated information to the requester that initiated invocation of the routine 500. After block 585, the routine continues to block 599 and ends.

Figure 6:
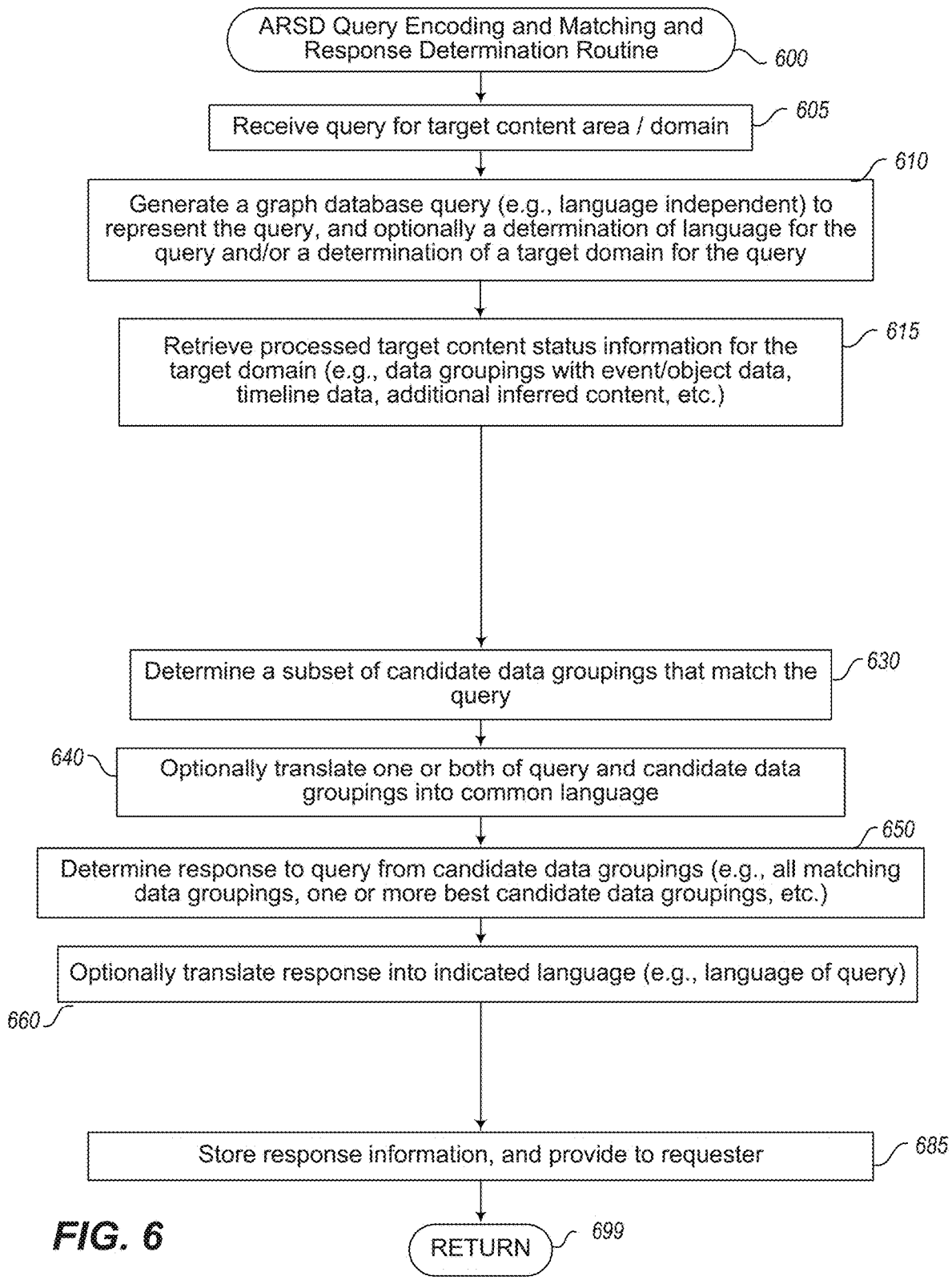
FIG. 6 illustrates a flow diagram of an example embodiment of an ARSD Query Encoding and Matching and Response Determination component routine.

FIG. 6 is a flow diagram of an example embodiment of an ARSD Query Encoding and Matching and Response Determination routine 600. The routine may be provided by, for example, execution of the ARSD Query Encoding component 144 and ARSD Matching component 146 and ARSD Response Determination component 148 of FIGS. 1A-1B and/or of one or more corresponding components (not shown) of the ARSD system 340 of FIG. 3 and/or with respect to corresponding functionality discussed with respect to FIGS. 2A-2G and elsewhere herein, such as to respond to a received query for a target domain by determining a response to the query using summarized and encoded information about the target domain. The routine 600 may be initiated by, for example, execution of block 450 of FIG. 4, with resulting information provided and execution control returning to that location when the routine 600 ends. In addition, in a manner similar to that of the other routines, the routine 600 may dynamically determine and provide responses to received queries in the illustrated embodiment, but in other embodiments may determine and store responses to some or all queries for some or all domains in advance of receiving corresponding new user queries (e.g., based on instructions received from a human operator of the ARSD system, based on previous queries by other users, etc.) and use such stored responses when such new queries are received. In addition, in the illustrated embodiment, the determination of encoded domain information in FIG. 5 is illustrated as being performed separately from the use of such information in FIG. 6, although in other embodiments such activities may be performed in other manners, including to dynamically perform some or all of the activities of FIGS. 5 and 6 in response to a received user query or other corresponding instruction.

The illustrated embodiment of the routine 600 begins in block 605, where a query is received corresponding to a target domain or other target content area. In block 610, the routine then generates an encoded version of the query in a format corresponding to one or more graph databases in use (e.g., in a language-independent manner, such as by identifying and using defined information corresponding to a database schema for such a graph database), optionally determines the language for the query, and determines a target domain to use for the query if not indicated in the information received in block 605 (e.g., based on an analysis of the content of the query), although in other embodiments such a query may instead be compared to information for multiple domains (e.g., all domains for which encoded information is available). In block 615, the routine then retrieves processed and encoded information for the target domain (e.g., data groupings and any additional/expanded information, etc.), such as by performing one or more corresponding queries on one or more such graph databases, although in other embodiments may instead dynamically generate such information (e.g., if the user query corresponds to a new target domain for which previously stored information is not available, if updates to the underlying information for the target domain are available but not yet analyzed, etc.).

In block 630, the routine then determines one or more candidate data groupings that match the query(ies), such as some or all results of performing the query(ies). In block 640, the routine then optionally translates one or both of the query and the candidate data groupings into a common language, such as if the multiple candidate data groupings are in different languages and/or if the query is in a different language from one or more of the candidate data groupings. In block 650, the routine then determines a response to the query from the candidate data groupings, such as all of the candidate data groupings, by analyzing the candidate data groupings (including any associated expanded information)

to select one or more of the candidate data groupings (or subsets of one or some or all of the candidate data groupings) that are determined to best match the query, etc. In block 660, the routine then optionally translates the determined response into an indicated language, such as the language of the query if some or all of the determined response is in a different language.

After block 660, the routine continues to block 685 to store the determined response information for later use, and to provide that determined information to the requester that initiated invocation of the routine 600. After block 685, the routine continues to block 699 and ends.

FIG. 7 is a flow diagram of an example embodiment of a client device routine 700. The routine may be provided by, for example, operations of a client computing device 110 of FIGS. 1A-1B and/or a client computing device 360 of FIG. 3 and/or with respect to corresponding functionality discussed with respect to FIGS. 2A-2G and elsewhere herein, such as to interact with users or other entities who submit queries (or other information) to the ARSD system, to receive responses (or other information) from the ARSD system, and to use the received information in one or more manners (e.g., to automatically implement corrective repair activities in accordance with a received response that includes corresponding executable instructions; to otherwise assist in initiating corrective or preventative repair activities in accordance with a received response that includes corresponding information, such as by displaying or otherwise presenting at least some such information to one or more users to enable them to perform at least some of the corresponding activities; to otherwise assist in providing information from the determined response to one or more users or other requesting entities; etc.).

The illustrated embodiment of the routine 700 begins at block 703, where information is optionally obtained and stored about the user and/or about a target domain, such as for later use in personalizing or otherwise customizing further actions to that user and/or that target domain. The routine then continues to block 705, where information or a request is received. In block 710, the routine determines if the information or request received in block 705 is to perform a query, and if not continues to block 785. Otherwise, the routine continues to block 720, where it receives the query in a natural language format (e.g., freeform text), and sends a query to the ARSD system interface to obtain a corresponding response, optionally after personalizing and/or customizing the information to be provided to the ARSD system (e.g., to add information specific to the user, such as location, demographic information, preference information, etc.; to add an indication of one or more specific target domains to use; etc.). In block 730, the routine then receives a response to the query from the ARSD system, such as to include repair status information or other information. In block 780, the routine then initiates use of the received query response information, such as to initiate automated repair activities, to display or otherwise present response information to the user, etc., including to optionally perform such use in a personalized and/or customized manner (e.g., to perform a display or other presentation in accordance with preference information for the user, to select a type of action to take based on information specific to the user, etc.). It will be appreciated that, while the routine indicates proceeding to block 730 immediately after block 725, in other embodiments the routine may operate in an asynchronous manner such that other operations are performed (e.g., corresponding to handling another set of instructions or information that are received in block 705, such as from a different user or other entity) while waiting for a response from block 725, and that the operations of block 725 may be performed in a substantially immediate manner (e.g., less than one second, less than 10 seconds, less than one minute, etc.) in at least some embodiments.

In block 785, the routine instead performs one or more other indicated operations as appropriate, with non-exclusive examples including sending information to the ARSD system of other types (e.g., status information about a new target domain for which to summarize and encode information before corresponding user queries are received, information to be processed for an indicated target domain, etc.), receiving and responding to requests for information about previous user queries and/or corresponding responses for a current user and/or client device, receiving and store information for later use in personalization and/or customization activities, receiving and responding to indications of one or more housekeeping activities to perform, etc.

After blocks 780 or 785, the routine continues to block 795 to determine whether to continue, such as until an explicit indication to terminate is received (or alternatively only if an explicit indication to continue is received). If it is determined to continue, the routine returns to block 705, and if not continues to block 799 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:
   encoding, by one or more computing systems, content from multiple documents, wherein the multiple documents are from multiple sources, wherein the content from the multiple documents includes repair status information, wherein the repair status information includes structured data and unstructured data, wherein the repair status information further includes multiple types of repair and maintenance actions performed for a plurality of devices, and wherein the encoding of the content from the multiple documents includes:

converting, by the one or more computing systems, the content from the multiple documents into a common format, wherein the converting includes analyzing the content from the multiple documents to identity indications of the plurality of the devices, wherein the converting further includes analyzing the content from the multiple documents to identity indications of the multiple types of repair and maintenance actions, wherein the converting further includes analyzing the content from the multiple documents to identity indications of attributes associated with the indicated multiple types of repair and maintenance actions, and wherein the converting further includes modifying at least some of the unstructured data into a structured format used by at least some of the structured data;

separating, by the one or more computing systems, the converted content from the multiple documents into a plurality of data groupings, wherein each data grouping includes a subset of the repair status information about a respective one indicated repair or maintenance action performed for a respective indicated one of the plurality of devices, wherein the subset of the repair status information for each of at least some of the data groupings includes information about one or more attributes associated with the respective one indicated repair or maintenance action for that data grouping, and wherein the subset of the repair status information for each of the at least some data groupings further includes information from some of the unstructured data and from some of the structured data;

determining, by the one or more computing systems, one or more times associated with performing the respective one indicated repair or maintenance action for each data grouping, and associating the determined one or more times for each data grouping with that data grouping;

for each of the data groupings, validating data included in that data grouping, wherein the validating is performed by the one or more computing systems and includes verifying, for the respective indicated one device for that data grouping, consistency between first and second groups of data, wherein the first group of data is the subset of the repair status information for that data grouping and the associated determined one or more times for that data grouping, and wherein the second group of data is the subset of the repair status information for each of one or more other data groupings for the respective indicated one device for that data grouping, and the associated determined one or more times for that data grouping for each of the one or more other data groupings;

encoding, by the one or more computing systems, the plurality of data groupings to generate a plurality of encoded data groupings, wherein each of the encoded data groupings includes the subset of repair status information included in an associated one of plurality of data groupings and further includes additional supplemental information, wherein the additional supplemental information is from one or more additional documents and provides further information about the plurality of devices that is not repair or maintenance information, wherein generating of each of the plurality of encoded data groupings includes storing data in a graph database storage format, wherein the stored data includes data items of multiple types about the respective indicated one repair or maintenance action performed for the respective indicated one device for the associated one data grouping for that encoded data grouping; and storing, by the one or more computing systems, the plurality of encoded data groupings in one or more graph databases in the graph database storage format;

encoding, by the one or more computing systems, a received query about an indicated type of repair or maintenance actions, wherein the received query is provided in a natural language format, and wherein the encoding of the received query includes generating a graph database query that represents semantic information of the received query;

determining, by the one or more computing systems, a response to the received query that provides information about the indicated type of the repair or maintenance actions performed for multiple devices of the plurality of devices, wherein the determining of the response includes:

identifying, by the one or more computing systems, multiple candidate encoded data groupings from the one or more graph databases that match the graph database query, wherein the multiple candidate encoded data groupings are a subset of the plurality of encoded data groupings; and generating, by the one or more computing systems and using the multiple candidate encoded data groupings, the response to the received query, wherein the response includes information from some of the unstructured data and from some of the structured data, wherein the response further includes information about one or more attributes associated with the repair or maintenance actions performed for the multiple devices, wherein the response further includes information about timelines for the repair or maintenance actions performed for the multiple devices, and wherein the response further includes information about the verified consistency for the data groupings associated with the multiple candidate encoded data groupings; and providing, by the one or more computing systems, the determined response to the received query, to initiate further repair or maintenance activities for at least one of the multiple devices, the initiated further repair or maintenance activities corresponding to the indicated type of the repair or maintenance actions.

2. The computer-implemented method of claim 1 wherein the validating of the data included in each of the plurality of data groupings includes inferring additional information about the indicated one device for that data grouping and further includes verifying accuracy of the determined one or more times for that data grouping, wherein the inferring of the additional information uses other information specific to a domain that includes the respective one indicated repair or maintenance action for that data grouping, wherein the determining of the response to the received query includes determining, by the one or more computing systems, executable instructions to automatically implement the further repair or maintenance activities for the at least one device, and wherein the providing of the determined response includes transmitting the executable instructions to the at least one device and initiating execution of the executable instructions on the at least one device to cause automatic implementation of the further repair or maintenance activities for the at least one device.

3. A computer-implemented method comprising:

encoding, by one or more computing systems, content from multiple documents, wherein the multiple documents are from multiple sources, and wherein the content from the multiple documents includes repair status information in multiple formats about at least one of repair or maintenance actions performed for a plurality of devices, including:

separating, by the one or more computing systems, content from the multiple documents into a plurality of data groupings, wherein each data grouping includes a subset of the repair status information about an indicated repair or maintenance action performed for an indicated one of the plurality of devices; and generating, by the one or more computing systems, a plurality of encoded data groupings, wherein the generating of the plurality of encoded data groupings includes converting data of the repair status information represented in the multiple formats to a common format, and wherein each of the plurality of encoded data groupings includes data items for an associated one of the plurality of data groupings for storage in a graph database, wherein the data items are of about the indicated repair or maintenance action for the associated one data grouping of that encoded data grouping and are of multiple types;

storing, by the one or more computing systems, the plurality of encoded data groupings in the graph database;

encoding, by the one or more computing systems, a received query about an indicated type of repair or maintenance action, wherein the received query is provided in a natural language format, and wherein the encoding of the received query includes generating a graph database query based on the received query;

determining, by the one or more computing systems, a response to the received query that provides information for one or more devices of the plurality of devices about the indicated type of repair or maintenance action, including:

identifying, by the one or more computing systems, one or more candidate encoded data groupings from the graph database that match the graph database query, wherein the one or more candidate encoded data groupings are a subset of the plurality of encoded data groupings; and generating, by the one or more computing systems and using at least one of the one or more candidate encoded data groupings, the response to the received query, wherein the generating of the response to the received query uses at least some of the multiple types of data items from the one or more candidate encoded data groupings, wherein the at least some types of data items include information about the indicated type of repair or maintenance action; and providing, by the one or more computing systems, the determined response to the received query, to initiate further activities for at least one of the one or more devices.

4. The computer-implemented method of claim 3 wherein the indicated type of repair or maintenance action is an indicated type of repair action, wherein the determining of the response to the received query by the one or more computing systems furthers includes identifying one or more problems for the at least one device from data in the identified one or more candidate encoded data groupings and determining executable instructions to automatically implement a corrective repair activity for the at least one device, and wherein the providing of the determined response includes initiating execution of the executable instructions to cause automatic implementation of the corrective repair activity for the at least one device.

5. The computer-implemented method of claim 3 wherein the data represented in the multiple formats includes first data in at least one unstructured format and second data in at least one structured format, wherein the converting of the data represented in the multiple formats to a common format includes converting the first data to a structured format, and wherein the generating of the plurality of encoded data groupings by the one or more computing systems further includes, for each of at least some of the plurality of encoded data groupings that include the identified one or more candidate encoded data groupings, determining one or more times associated with performing the indicated repair or maintenance action for that data grouping, associating the determined one or more times with that data grouping, and verifying consistency of the data included in and associated with that data grouping with other information included in and associated with one or more other data groupings for the indicated one device for that data grouping, and wherein the generating of the response to the received query involves, for each of the identified one or more candidate encoded data groupings, including information in the response about the determined one or more times associated with that identified candidate encoded data grouping and based on the verified consistency for that identified candidate encoded data grouping.

6. A non-transitory computer-readable medium having stored contents that cause one or more computing systems to perform automated operations, the automated operations including at least:

encoding, by the one or more computing systems, status information based on performance of a plurality of types of actions, wherein the encoding uses input information with data represented in multiple formats about the performance of the plurality of types of actions, and wherein the encoding includes:

separating, by the one or more computing systems, the input information into a plurality of data groupings, wherein each of the plurality of data groupings includes information about an indicated performed action;

generating, by the one or more computing systems, a plurality of encoded data groupings to represent the plurality of data groupings, wherein the generating of the plurality of encoded data groupings includes converting the data represented in the multiple formats to a common format, and wherein each of the plurality of encoded data groupings includes data items for an associated one of the plurality of data groupings for storage in a graph database, wherein the data items are about the indicated performed action for that data grouping and are of multiple types; and storing, by the one or more computing systems, the plurality of encoded data groupings in the graph database;

encoding, by the one or more computing systems, a received query about an indicated type of action, wherein the received query is provided in a natural language format, and wherein the encoding includes generating a graph database query based on the received query;

determining, by the one or more computing systems, a response to the received query that provides information about one or more performances of the indicated type of action, wherein the determining of the response includes identifying one or more candidate encoded data groupings from the graph database that match the graph database query, and wherein the determining of the response further includes generating the response to the received query using at least some of the multiple types of data items for the one or more candidate encoded data groupings; and providing, by the one or more computing systems, the determined response to the received query with the provided information about the one or more performances of the indicated type of action, to initiate implementation of at least one further related activity.

7. The non-transitory computer-readable medium of claim 6 wherein the plurality of type of actions in the target area include at least one of repair or maintenance actions performed for a plurality of devices, wherein the one or more performances of the indicated type of action are for at least one device of the plurality of devices, wherein the stored contents include software instructions that, when executed by the one or more computing systems, cause the one or more computing systems to perform further automated operations including identifying, by the one or more computing systems, one or more corrective activities to be performed on the at least one device based at least in part on the at least some of the multiple types of data items for the one or more candidate encoded data groupings, and wherein the providing of the determined response to the received query includes initiating, by the one or more computing systems, performance of executable instructions to cause implementation of the one or more corrective activities on the at least one device.

8. The non-transitory computer-readable medium of claim 6 wherein the data represented in the multiple formats includes first data in at least one unstructured format and second data in at least one structured format, wherein the converting of the data represented in the multiple formats to a common format includes converting the first data to a structured format, and wherein the generating of the plurality of encoded data groupings further includes, for each of at least some of the plurality of encoded data groupings that include the identified one or more candidate encoded data groupings, determining one or more times associated with performing the indicated action for that data grouping, and associating the determined one or more times with that data grouping, and wherein the determining of the response to the received query involves, for each of the identified one or more candidate encoded data groupings, including information in the response about the determined one or more times associated with that identified candidate encoded data grouping.

9. The non-transitory computer-readable medium of claim 6 wherein the data represented in the multiple formats includes first data in at least one unstructured format and second data in at least one structured format, wherein the converting of the data represented in the multiple formats to a common format includes converting the first data to a structured format, and wherein the generating of the plurality of encoded data groupings further includes, for each of at least some of the plurality of encoded data groupings that include the identified one or more candidate encoded data groupings, verifying consistency of the data included in and associated with that data grouping with other information included in and associated with one or more other data groupings for an entity associated with that data grouping, and wherein the determining of the response to the received query involves, for each of the identified one or more candidate encoded data groupings, including information in the response based on the verified consistency for that identified candidate encoded data grouping.

10. A system comprising:

one or more hardware processors of one or more computing systems;

one or more storage devices with a graph database, wherein the graph database includes stored status information related to performance of a plurality of types of actions in a target area for a plurality of entities, wherein the status information includes a plurality of data groupings that are generated from analysis of input information with both structured and unstructured data, and wherein each of the plurality of data groupings is encoded to specify data items of multiple types about an indicated action that has been performed for an associated entity; and one or more memories with stored instructions that, when executed by at least one of the one or more hardware processors, cause the one or more computing systems to perform automated operations including at least:

encoding a received query about an indicated type of action in the target area, wherein the received query is provided in a natural language format, and wherein the encoding of the received query includes generating a graph database query for the received query;

determining a response to the received query that provides information about performance of the indicated type of action for one or more entities, wherein the determining of the response includes identifying one or more candidate data groupings from the graph database that match the graph database query, and wherein the determining of the response further includes generating the response to the received query using at least some of the multiple types of data items for the one or more candidate data groupings; and providing the determined response to the received query with the information about the performance of the indicated type of action for the one or more entities, to initiate implementation of at least one further related activity for at least one of the one or more entities.

11. The system of claim 10 wherein the plurality of types of actions in the target area include at least one of repair or maintenance actions, wherein the input information is in multiple documents that are from multiple sources and that include data about the at least one of repair or maintenance actions in both structured and unstructured formats, and wherein the stored instructions include software instructions that, when executed by the one or more computing systems, cause the one or more computing systems to perform further automated operations including generating and storing the encoded status information by:

converting the structured and unstructured data about the at least one of repair or maintenance actions to a common structured format;

separating the converted structured and unstructured data into a plurality of initial data groupings each including a subset of the input information that is about an indicated repair or maintenance action performed for an indicated one of the plurality of entities;

generating the plurality of encoded data groupings to represent the repair status information, including generating, for each of the plurality of initial data groupings, one of the plurality of encoded data groupings for storage in the graph database to specify data items of multiple types about the indicated repair or maintenance action for that data grouping; and storing the plurality of encoded data groupings in the graph database.

12. The system of claim 11 wherein the plurality of types of actions are performed for a plurality of devices, wherein the one or more performances of the indicated type of action are for at least one device of the plurality of devices, wherein the further automated operations include identifying one or more corrective activities to be performed on the at least one device based at least in part on the at least some of the multiple types of data items for the one or more candidate encoded data groupings, and wherein the providing of the determined response to the received query includes initiating performance of executable instructions to cause implementation of the one or more corrective activities on the at least one device.

13. The system of claim 11 wherein the generating and storing of the encoded status information further includes, for each of at least some of the plurality of initial data groupings:

analyzing the subset of the input information for that initial data grouping about the indicated repair or maintenance action performed for the indicated one entity to identify information about that indicated one entity, and information about that indicated repair or maintenance action, and information about one or more attributes associated with that indicated repair or maintenance action, and information about one or more relationships between that indicated one entity and that indicated repair or maintenance action;

storing information about the indicated one entity in a first node of the graph database;

storing information about that indicated repair or maintenance action in a second node of the graph database that includes the one or more attributes associated with that indicated repair or maintenance action; and storing information about the one or more relationships in association with edges between those nodes of the graph database, and wherein, for each of the at least some initial data groupings, the generated one encoded data grouping for that initial data grouping includes the identified information for that initial data grouping, wherein the one or more candidate data groupings include at least one of the at least some data groupings, and wherein the generated response includes, for each of the at least one data groupings, the identified information for that data grouping.

14. The system of claim 13 wherein the at least one of repair or maintenance actions include at least one of treatments or procedures involving applying materials to entities and performing tests on entities, and wherein identifying of information for the at least some initial data groupings further includes identifying materials applied to entities identified for the at least some initial data groupings, and identifying tests performed on those identified entities, and identifying results of those tests, and identifying codes from one or more enumerated sets of codes that represent the at least one of treatments or procedures corresponding to the identified materials and identified tests.

15. The system of claim 11 wherein the generating and storing of the encoded status information further includes, for each of at least some of the plurality of initial data groupings, analyzing the subset of the input information for that initial data grouping about the indicated repair or maintenance action performed for the indicated one entity to identify information including one or more times associated with performing that indicated repair or maintenance action, wherein, for each of the at least some initial data groupings, the generated one encoded data grouping for that initial data grouping includes the identified information for that initial data grouping, wherein the one or more candidate data groupings include at least one of the at least some data groupings, and wherein the generated response includes, for each of the at least one data groupings, the identified information for that data grouping.

16. The system of claim 15 wherein identifying of the information for each of the at least some initial data groupings including the one or more times associated with performance of the indicated repair or maintenance action for that initial data grouping further includes identifying a timeline associated with that performance that is based on multiple times, at least one of the multiple times being a relative time that is adjusted to an absolute time during the analyzing for that initial data grouping, and wherein the providing of the determined response includes displaying the identified time for each of the at least one data groupings.

17. The system of claim 11 wherein the generating and storing of the encoded status information further includes, for each of at least some of the plurality of initial data groupings, analyzing the subset of the input information for that initial data grouping about the indicated repair or maintenance action performed for the indicated one entity to verify consistency of data identified in that initial data grouping with other data in one or more other data groupings associated with that indicated one entity, wherein, for each of the at least some initial data groupings, the generated one encoded data grouping for that initial data grouping includes information based on the verified consistency for that initial data grouping, wherein the one or more candidate data groupings include at least one of the at least some data groupings, and wherein the generated response includes, for each of the at least one data groupings, the included information for that data grouping based on the verified consistency for that initial data grouping.

18. The system of claim 17 wherein, for each of the at least some initial data groupings, verifying of the consistency of the data identified in that initial data grouping includes applying one or more defined consistency rules to evaluate the consistency, including for one of the at least some initial data groupings to analyze timing information included in the data identified in that initial data grouping.

19. The system of claim 11 wherein the generating and storing of the encoded status information further includes, for each of at least some of the plurality of initial data groupings, analyzing the subset of the input information for that initial data grouping about the indicated repair or maintenance action performed for the indicated one entity to infer additional information based at least in part on that subset of the input information and on further information specific to the target area, wherein, for each of the at least some initial data groupings, the generated one encoded data grouping for that initial data grouping includes the inferred additional information for that initial data grouping, wherein the one or more candidate data groupings include at least one of the at least some data groupings, and wherein the generated response includes, for each of the at least one data groupings, the inferred additional information for that data grouping.

20. The system of claim 19 wherein inferring of the additional information for each of the at least some initial data groupings includes identifying at least one of an effect over time on the indicated one entity for that initial data grouping based at least in part on the indicated repair or maintenance action for that initial data grouping, or a combination effect on the indicated one entity for that initial data grouping based at least in part on a combination of the indicated repair or maintenance action for that initial data grouping and one or more additional actions performed by or on the indicated one entity for that initial data grouping, and wherein the providing of the determined response includes displaying the identified at least one of the effect over time or the combination effect for each of the at least one data groupings.

21. The system of claim 19 wherein the target area relates to a medical area, wherein the further information specific to the target area includes at least one of information about drug interactions, or information about effects of individual medical repair or maintenance actions, or information about effects of combinations of multiple actions at different times, and wherein the providing of the determined response includes displaying information for each of the at least one data groupings about how the additional information for that data grouping is inferred using the further information.

22. The system of claim 10 wherein the plurality of types of actions include actions to at least one of treat or prevent health issues that include at least one of indicated conditions or indicated symptoms, wherein the plurality of encoded data groupings include information from clinical notes of doctors and from electronic medical records of patient entities, and wherein the plurality of data groupings are encoded to satisfy a defined common data model.

23. The system of claim 22 wherein the actions to at least one of treat or prevent health issues include treatments or procedures involving applying medicines to the patient entities and performing tests on the patient entities, and wherein the data items of at least some types for the one or more candidate data groupings include one or more medicines applied to one or more patient entities identified for the at least some initial data groupings, and one or more tests performed on those one or more patient entities, and one or more results of those tests.

24. The system of claim 22 wherein the received query includes at least one of an indicated medical problem or an indicated medical condition or an indicated medical symptom, and wherein the determined response includes information about at least one of the patient entities that is identified as having or not having received treatment or prevention actions corresponding to the at least one of an indicated medical problem or an indicated medical condition or an indicated medical symptom.

25. The system of claim 22 wherein the received query includes an indication of one of the patient entities, and wherein the determined response includes information about the one indicated patient entity being identified as having or not having received treatment or prevention actions for at least one of an indicated medical problem or an indicated medical condition or an indicated medical symptom.

26. The system of claim 10 wherein generating of the plurality of data groupings includes analyzing and modifying the input information to anonymize the data items in the plurality of data groupings by removing identifying information about the plurality of entities.

27. The system of claim 10 wherein multiple languages are used in the plurality of data groupings and the received query, and wherein at least one of generating the plurality of data groupings or the determining of the response to the received query includes automatically translating at least one of the received query or at least some of the input information into a different language.

28. The system of claim 10 wherein the data items specified for each of the plurality of data groupings are extracted from one of multiple documents that in combination provide the input information, and wherein the determining of the response includes gathering, from one of the multiple documents from which the data items specified for at least one of the one or more candidate data groupings is extracted, non-textual information associated with the at least one candidate data grouping, and including the gathered non-textual information as part of the information provided in the determined response.

29. The system of claim 10 wherein the automated operations include, before the encoding of the received query, receiving contents of multiple documents related to the target area that includes the input information, and extracting the data items specified for the plurality of data groupings from the contents of the multiple documents, and generating the plurality of data groupings using the extracted data items, and storing the plurality of data groupings in the graph database, and wherein the automated operations further include, after the providing of the determined response to the received query:
obtaining additional contents of one or more additional documents related to the target area;
extracting, from the additional contents, multiple additional data items related to performance of one or more additional actions for at least one entity of the plurality of entities;
generating one or more additional data groupings that include the multiple additional data items, and storing the one or more additional data groupings in the graph database;
encoding an additional received query about an additional type of information by generating an additional graph database query that represents semantic information of the additional received query;
determining an additional response to the additional received query that provides information of the additional type, including identifying one or more additional candidate data groupings from the graph database that match the additional graph database query and that include at least one of the one or more additional candidate data groupings, and generating the additional response to the additional received query using at least some of the multiple additional data items for the at least one additional candidate data grouping; and
providing the determined additional response to the additional received query.

30. The system of claim 29 wherein the automated operations further include using at least one defined language model to determine semantic similarity between multiple data items, and associating the multiple data items together as a same type of data item.

* * * * *